US012655352B2

(12) United States Patent
Nasajpour et al.

(10) Patent No.: US 12,655,352 B2
(45) Date of Patent: Jun. 16, 2026

(54) DEVICES COMPRISING A LIQUID CRYSTAL LAYER AND USES THEREOF

(71) Applicants: THE REGENTS OF THE UNIVERSITY OF CALIFORNIA, Oakland, CA (US); Amir Nasajpour, Los Angeles, CA (US); Paul S. Weiss, Los Angeles, CA (US)

(72) Inventors: Amir Nasajpour, Los Angeles, CA (US); Paul S. Weiss, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 366 days.

(21) Appl. No.: 18/254,612

(22) PCT Filed: Dec. 3, 2021

(86) PCT No.: PCT/US2021/061725

§ 371 (c)(1),
(2) Date: May 26, 2023

(87) PCT Pub. No.: WO2022/120120

PCT Pub. Date: Jun. 9, 2022

(65) Prior Publication Data

US 2023/0416608 A1      Dec. 28, 2023

Related U.S. Application Data

(60) Provisional application No. 63/121,174, filed on Dec. 3, 2020.

(51) Int. Cl.
C09K 19/36        (2006.01)
C09K 19/02        (2006.01)
G02F 1/13          (2006.01)

(52) U.S. Cl.
CPC .............. C09K 19/36 (2013.01); C09K 19/02 (2013.01); G02F 1/1306 (2013.01); *G02F 2203/34* (2013.01)

(58) Field of Classification Search
CPC ....... C09K 19/36; C09K 19/02; G02F 1/1306; G02F 2203/34
See application file for complete search history.

(56) References Cited

U.S. PATENT DOCUMENTS

| | | | |
|---|---|---|---|
| 7,122,227 B2 | 10/2006 | Vaughn-Spickers | |
| 10,481,311 B2 | 11/2019 | Yanai | |
| 2012/0071618 A1* | 3/2012 | Goldfinger | C09K 19/3068 560/72 |
| 2018/0143438 A1 | 5/2018 | Oh | |
| 2018/0143470 A1* | 5/2018 | Oh | G02F 1/133703 |

* cited by examiner

*Primary Examiner* — Nathan T Leong
(74) *Attorney, Agent, or Firm* — Riverside Law LLP

(57)        ABSTRACT

The present invention provides devices comprising at least one liquid crystal layer and methods of use thereof. The present invention also provides methods for generating said devices.

17 Claims, 9 Drawing Sheets

1. Cholesteryl oleyl carbonate

2. Cholesteryl pelargonate

3. Cholesteryl benzoate (1) 70 mg        (2) 10 mg        (3) 20 mg        Temp 20-25

1. Cholesteryl oleyl carbonate

2. Cholesteryl pelargonate

3. Cholesteryl benzoate (1) 70 mg          (2) 10 mg          (3) 20 mg          Temp 20-25

Ceramic Substrate

Time Lapse

DEVICES COMPRISING A LIQUID CRYSTAL LAYER AND USES THEREOF

CROSS-REFERENCE TO RELATED APPLICATIONS

This application is a national phase application filed under 35 U.S.C. § 371 claiming benefit to PCT International Application PCT/US2021/061725, filed Dec. 3, 2021, which claims priority to and the benefit of U.S. Provisional Application No. 63/121,174, filed Dec. 3, 2020, the disclosures of which are hereby incorporated by reference herein in their entireties.

BACKGROUND OF THE INVENTION

The liquid crystalline (LC) phase shares properties seen in both liquids and solids. Historically, LC-based materials have been applied in commercial applications with great success, such as in the development of KEVLAR® body armor and the fabrication of modern liquid crystal displays (Andrienko D, 2018, J. Mol. Liq., 267:520-541). More recently, LCs have been used to mimic various biological processes, ranging from epithelial tissue organization, bacterial biofilm formation, and the assembly of many biologically derived materials (Saw T B et al., 2017, Nature, 544:212-216; Perez-Gonzalez C et al., 2019, Nat. Phys., 15:79-88; Patteson A E et al., 2018, Nat. Commun., 9:5373; Mitov M, 2017, Soft Matter, 13:4176-4209; Jewell S A, 2011, Liq. Cryst., 38:1699-1714). The synthesis of LC biomaterials is poised to address challenges in recapitulating mechanics seen in the native extracellular matrix (ECM) (Tibbitt M W et al., 2018, Chem.: Eur. J., 24:12206-12220; Mohamed M A et al., 2019, Prog. Polym. Sci., 98:101147; Nasajpour A et al., 2020, ACS Materials Letters, 2:1067-1107).

Thus, there is a need in the art for improved methods and technologies that produce liquid crystals and devices comprising said liquid crystals for the development of dynamic and responsive interfaces for various applications. The present invention satisfies this unmet need.

BRIEF SUMMARY OF THE INVENTION

In one aspect, the present invention relates, in part, to methods of fabricating a device, comprising the steps of: generating a liquid crystal mesogen comprising cholesteryl oleyl carbonate or a derivative or a salt thereof, cholesteryl pelargonate or a derivative or a salt thereof, cholesteryl benzoate or a derivative or a salt thereof, or any combination thereof; melting the liquid crystal mesogen; cooling the liquid crystal mesogen to generate a viscous liquid; and placing the viscous liquid on at least a portion of a surface of a first substrate to generate the liquid crystal layer on the substrate. In various aspects, the method further comprises placing a second substrate over the liquid crystal layer, such that the liquid crystal layer is between the first and second substrates.

In some embodiments, the method is a solvent-free method.

In some embodiments, the first and second substrates protect the liquid crystal layer from exposure to at least one gas, vapor, moisture, pressure, temperature, or any combination thereof.

In some embodiments, the first substrate and/or the second substrate is a transparent, semi-transparent, or opaque substrate.

In some embodiments, the first substrate and/or the second substrate comprises a glass, polymer, graphene, graphene oxide, graphite, metal, composite, wood, paper, rubber, fabric, fibrous network, mineral, or any combination thereof. In some embodiments, the polymer is polyester, polyolefin, polyvinyl chloride, polystyrene, polycaprolactone, polyethylene, polycarbonate, or any combination thereof. In some embodiments, the composite is an organic-inorganic composite, nacre, glass composite, fiber composite, glass fiber composite, carbon composite, or any combination thereof.

In one embodiment, the method comprises melting the liquid crystal mesogen at about 60° C.

In another embodiment, the method comprises placing the viscous liquid on at least a portion of the surface of the first substrate by solvent-free electrospinning, solvent-free spin coating, solvent-free electrospraying, solvent-free airbrushing, solvent-free brushing, or any combination thereof.

In one embodiment, the liquid crystal mesogen comprises cholesteryl ester liquid crystal mesogen. Thus, in one embodiment, the liquid crystal layer comprises a nonwoven cholesteryl ester liquid crystal scaffold. In another embodiment, the liquid crystal layer comprises an electrospun nonwoven cholesteryl ester liquid crystal scaffold.

In some embodiments, the liquid crystal layer has a mesophase between about 10° C. and about 60° C. In some embodiments, the liquid crystal layer forms striations at a temperature between about 36° C. and about 40° C.

In various embodiments, the liquid crystal layer is a molecular switch. In various embodiments, the liquid crystal layer changes color when exposed to a stimulus. In some embodiments, the stimulus comprises a change in temperature, voltage, light, radiation, sound, hydration, pH, pressure, or any combination thereof.

In another aspect, the present invention relates, in part, to a devices made using any of the solvent-free method described herein.

In various embodiments, the device is a tunable device. In one embodiment, the tunable device changes color when exposed to a stimulus.

In various embodiments, the device is a watch face. In one embodiment, the watch face is a tunable watch face. In one embodiment, the tunable watch face changes color when exposed to a stimulus (e.g., a change in temperature, voltage, light, radiation, sound, hydration, pH, pressure, or any combination thereof).

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

DETAILED DESCRIPTION

Figure 1:
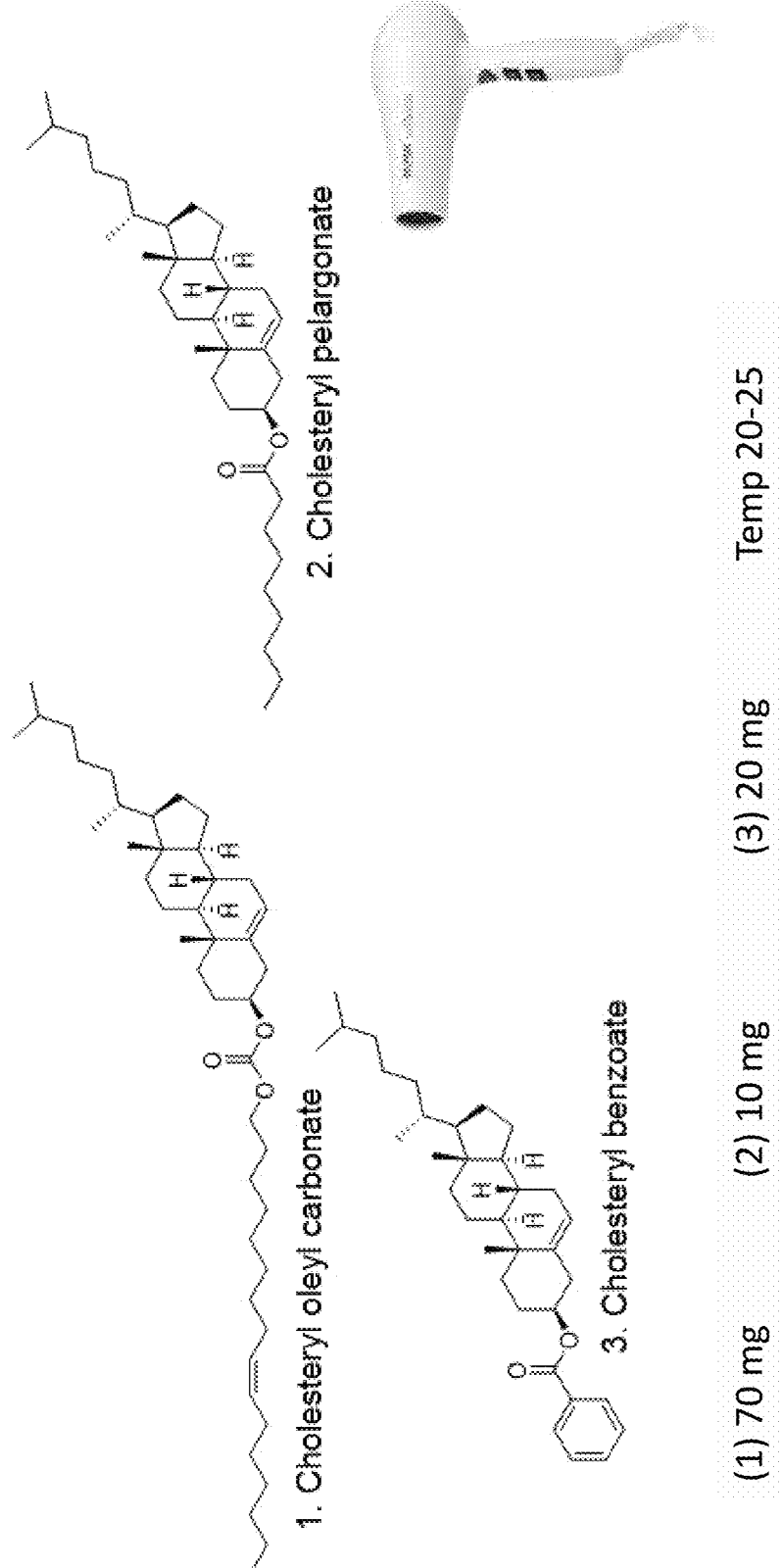
FIG. 1 depicts schematic representations of cholesteryl oleyl carbonate, cholesteryl pelargonate, and cholesteryl benzoate components of the liquid crystals described herein.

The present invention is based, in part, on the discovery of novel solvent-free methods of fabricating devices comprising at least one liquid crystal layer. Thus, the present invention is directed, in part, to devices comprising a substrate, having an external surface and an opposite internal surface, and a liquid crystal layer placed on at least a portion of the internal surface of the substrate. The present invention is also directed, in part, to devices comprising a first substrate having an external surface and an opposite internal surface, a second substrate having an external surface and an opposite internal surface, and a liquid crystal layer placed between at least a portion of the internal surface of the first substrate and at least a portion of the internal layer of the second substrate. The present invention is also directed, in part, to methods of fabricating said devices and methods of using said devices in various applications, such as watch faces.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass non-limiting variations of ±40% or ±20% or ±10%, ±5%, ±1%, or ±0.1% from the specified value, as such variations are appropriate.

The term "derivative" refers to a small molecule that differs in structure from the reference molecule, but retains the essential properties of the reference molecule. A derivative may change its interaction with certain other molecules relative to the reference molecule. A derivative molecule may also include a salt, an adduct, tautomer, isomer, or other variant of the reference molecule.

As used herein, the term "substrate" refers to a solid object or support upon which another material is layered or attached. Solid supports include, but are not limited to, glass, metals, gels, and filter paper, among others.

As used herein, "top surface" or "external surface" of the substrate are used interchangeably and refer to the surface of the substrate furthest away from the liquid crystal layer, while "bottom surface" or "internal surface" of the substrate are used interchangeably and refer to the surface of the substrate closest to the liquid crystal layer. Where a first layer is described as "disposed over" a second layer, the first layer is disposed further away from the external surface of the substrate. There may be other layers between the first and second layer, unless it is specified that the first layer is "in contact with" the second layer. For example, a liquid crystal layer may be described as "disposed over" at least a portion of the internal surface of the substrate, even though there are various organic layers in between.

As used herein, the terms "material" and "materials" refer to, in their broadest sense, any composition of matter.

As used and depicted herein, a "layer", for example a liquid crystal layer, refers to a member or component of a device being principally defined by a thickness, for example in relation to other neighboring layers, and extending outward in length and width. It should be understood that the term "layer" is not necessarily limited to single layers or sheets of materials. In addition, it should be understood that the surfaces of certain layers, including the interface(s) of such layers with other material(s) or layers(s), may be imperfect, wherein said surfaces represent an interpenetrating, entangled or convoluted network with other material(s) or layer(s). Similarly, it should also be understood that a layer may be uniform or discontinuous, such that the continuity of said layer along the length and width may be disturbed or otherwise interrupted by other layer(s) or material(s).

As used herein, the term "transparent" may refer to a material that permits at least 50% of the incident electromagnetic radiation at relevant wavelengths to be transmitted through it. In a device comprising a liquid crystal surface of the present invention, it may be desirable to allow the maximum amount of ambient electromagnetic radiation from the device exterior to be admitted to the liquid crystal layer region of the device. That is, the electromagnetic radiation must reach a liquid crystal layer(s), where it can stimulate the color change of the liquid crystal layer. This often dictates that at least one of the substrates of the device should be minimally absorbing and minimally reflecting of the incident electromagnetic radiation. In some cases, such a contact should be transparent or at least semi-transparent.

As used herein, the term "semi-transparent" may refer to a material that permits some, but less than 50% transmission of ambient electromagnetic radiation in relevant wavelengths. Where a transparent or semi-transparent substrate is used, the opposing substrate may be a reflective material so that light which has passed through the liquid crystal layer without being stimulating the color change of the liquid crystal layer is reflected back through the liquid crystal layer.

As used herein, the term "mesogen" refers compounds that form liquid crystals, and in particular rigid rodlike or disclike molecules, which are components of liquid crystalline materials.

As used herein, the term "liquid crystal" refers to a thermodynamic stable phase characterized by anisotropy of properties without the existence of a three-dimensional crystal lattice, generally lying in the temperature range between the solid and isotropic liquid phase.

As used herein, "thermotropic liquid crystal" refers to liquid crystals that result from the melting of mesogenic solids due to an increase in temperature. Both pure substances and mixtures form thermotropic liquid crystals.

The term "lyotropic," as used herein, refers to molecules that form phases with orientational and/or positional order in a solvent. Lyotropic liquid crystals can be formed using amphiphilic molecules (e.g., sodium laurate, phosphatidylethanolamine, lecithin). The solvent can be water.

As used herein, the term "heterogenous surface" refers to a surface that orients liquid crystals in at least two separate planes or directions, such as across a gradient.

As used herein, "nematic" refers to liquid crystals in which the long axes of the molecules remain substantially parallel, but the positions of the centers of mass are randomly distributed. Nematic liquid crystals can be substantially oriented by a nearby surface.

"Chiral nematic," as used herein refers to liquid crystals in which the mesogens are optically active. Instead of the director being held locally constant, as is the case for nematics, the director rotates in a helical fashion throughout the sample. Chiral nematic crystals show a strong optical activity, which is much higher than can be explained on the basis of the rotatory power of the individual mesogens. When light equal in wavelength to the pitch of the director impinges on the liquid crystal, the director acts like a diffraction grating, reflecting most and sometimes all of the light incident on it. If white light is incident on such a material, only one color of light is reflected and it is circularly polarized. This phenomenon is known as selective reflection and is responsible for the iridescent colors produced by chiral nematic crystals.

"Smectic," as used herein refers to liquid crystals that are distinguished from "nematics" by the presence of a greater degree of positional order in addition to orientational order; the molecules spend more time in planes and layers than they do between these planes and layers. "Polar smectic" layers occur when the mesogens have permanent dipole moments. In the smectic A2 phase, for example, successive layers show anti ferroelectric order, with the direction of the permanent dipole alternating from layer to layer. If the molecule contains a permanent dipole moment transverse to the long molecular axis, then the chiral smectic phase is ferroelectric. A device utilizing this phase can be intrinsically bistable.

"Frustrated phases," as used herein, refers to another class of phases formed by chiral molecules. These phases are not chiral, however, twist is introduced into the phase by an array of grain boundaries. A cubic lattice of defects (where the director is not defined) exist in a complicated, orientationally ordered twisted structure. The distance between these defects is hundreds of nanometers, so these phases reflect light just as crystals reflect X-rays.

"Discotic phases" are formed from molecules which are disc shaped rather than elongated. Usually these molecules have aromatic cores and six lateral substituents. If the molecules are chiral, a chiral nematic discotic phase can form.

As used herein, the term "spectrum" refers to the distribution of light energies arranged in order of wavelength.

As used herein, the term "visible spectrum" refers to light radiation that contains wavelengths from approximately 360 nm to approximately 800 nm.

As used herein, the term "ultraviolet irradiation" refers to exposure to radiation with wavelengths less than that of visible light (i.e., less than approximately 360 nm) but greater than that of X-rays (i.e., greater than approximately 0.1 nm). Ultraviolet radiation possesses greater energy than visible light and is therefore, more effective at inducing photochemical reactions.

The terms "coat," "coated," or "coating," as used herein, refer to at least a partial coating of the surface of the substrate. One hundred percent coverage is not necessarily implied by these terms.

As used herein, "spin coating" may refer to the process of solution depositing a layer or film of one material (i.e., the coating material) on a surface of the device. The spin coating process may include applying a small amount of the coating material on the center of the substrate, which is either spinning at low speed or not spinning at all. The substrate is then rotated at high speed in order to spread the coating material by centrifugal force. Rotation is continued while the fluid spins off the edges of the substrate, until the desired thickness of the film is achieved. The higher the angular speed of spinning, the thinner the film. The thickness of the film also depends on the viscosity of the liquid crystal mesogen.

As used herein, the term "solvent" describes a liquid that serves as the medium for a reaction or a medium for the distribution of components of different phases or extraction of components into said solvent. Also, as used herein, the term "solvent" is intended to encompass liquids in which the raw materials or the reaction mixture are dispersed, suspended, or at least partially solvated. Examples of solvents include, but are not limited to, alcohols, benzenes, toluenes, chloroforms, and cyclohexanes.

As used herein, the terms "solvent-free", "at least substantially solvent-free", "at least substantially free of a solvent", and other like variants are used interchangeably to mean that no solvent is intentionally added to, or used in, any raw material or the reaction mixture (which includes all of the raw materials) during any of the processing steps leading to the formation of the metallic silver. It is to be understood that a raw material or reaction mixture that is at least substantially free of a solvent may inadvertently contain small amounts of a solvent owing to contamination or it may contain no amount of solvent.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range, such as from 1 to 6, should be considered to have specifically disclosed subranges, such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DESCRIPTION

The present invention is based, in part, on the discovery of novel solvent-free methods of fabricating devices comprising at least one liquid crystal layer. Thus, the present invention is directed, in part, to devices comprising a substrate, having an external surface and an opposite internal surface, and a liquid crystal layer placed on at least a portion of the internal surface of the substrate. The present invention is also directed, in part, to devices comprising a first substrate having an external surface and an opposite internal surface, a second substrate having an external surface and an opposite internal surface, and a liquid crystal layer placed between at least a portion of the internal surface of the first substrate and at least a portion of the internal layer of the second substrate. The present invention is also directed, in part, to methods of fabricating said devices and methods of using said devices in various applications, such as watch faces.

Device

In one aspect, the present invention relates, in part, to a device comprising a substrate, having an external surface and an opposite internal surface, and a liquid crystal layer placed on at least a portion of the internal surface of the substrate. In some embodiments, the substrate is a planar or curved substrate. In some embodiments, the substrate is a transparent, semi-transparent, or opaque substrate. In one embodiment, the liquid crystal layer is in contact with at least a portion of the internal surface of the substrate. For example, in one embodiment, the liquid crystal layer is deposited on at least a portion of the internal surface of the substrate. In another embodiment, the liquid crystal layer is disposed over at least a portion of the internal surface of the substrate.

In another aspect, the present invention relates, in part, to a device comprising two planar substrates, each having an external surface and an opposite internal surface, and a liquid crystal layer placed between at least a portion of the internal surfaces of the two planar substrates. Thus, in some embodiments, the present invention provides a device comprising a first planar substrate, having an external surface and an opposite internal surface, a second planar substrate, having an external surface and an opposite internal surface, and a liquid crystal layer placed between at least a portion of the internal surface of the first planar substrate and at least a portion of the internal surface of the second planar substrate. In some embodiments, the first substrate is a planar or curved substrate. In some embodiments, the first substrate is a transparent, semi-transparent, or opaque substrate. In some embodiments, the second substrate is a planar or curved substrate. In some embodiments, the second substrate is a transparent, semi-transparent, or opaque substrate.

In one embodiment, the liquid crystal layer is in contact with at least a portion of the internal surface of the first substrate, at least a portion of the internal surface of the second substrate, or a combination thereof. For example, in one embodiment, the liquid crystal layer is deposited on at least a portion of the internal surface of the first substrate, and at least a portion of the internal surface of the second substrate, or a combination thereof. In another embodiment, the liquid crystal layer is disposed over at least a portion of the internal surface of the first substrate, at least a portion of the internal surface of the second substrate, or a combination thereof.

In various embodiments, the device is sealed. In some embodiments, the device is sealed to protect the liquid crystal layer from damaging exposure to harmful species in the environment including moisture, vapor, pressure change, temperature change, and/or gases, etc. In some embodiments, the device is sealed to maintain the liquid crystal layer at constant pressure, gas composition, temperature, or any combination thereof.

In various embodiments, the second substrate is a barrier layer. In some embodiments, the second substrate protects the liquid crystal layer from damaging exposure to harmful species in the environment including moisture, vapor, pressure change, temperature change, and/or gases, etc. In some embodiments, the second substrate comprises a single layer or multiple layers. In some embodiments, the second substrate may be formed by various known chemical vapor deposition techniques and may include compositions having a single phase as well as compositions having multiple phases. In some embodiments, the second substrate may be deposited over and/or next to a liquid crystal layer, or over any other parts of a device including an edge. For example, in some embodiments, the second layer is deposited over an edge of the device sealing the device from damaging exposure to harmful species in the environment including moisture, vapor and/or gases, etc.

In some embodiments, the device optionally comprises at least one barrier between different regions on the substrate so that liquid crystal layers can be in some areas but not others and/or different liquid crystal layers can be on different regions of the substrate.

In one embodiment, the liquid crystal layer is a single layer. In one embodiment, the liquid crystal layer is a multilayer. In one embodiment, the liquid crystal layer is a uniform layer. In one embodiment, the liquid crystal layer is a sub-layer. In some embodiments, the liquid crystal layer is a stacked or side-by-side (i.e., adjacent) arrangement of liquid crystal sublayers. In one embodiment, the liquid crystal layer includes liquid crystal sublayers that are arranged in a horizontally adjacent pattern. Thus, it should be understood that the liquid crystal layer is not necessarily limited to single layers or sheets of materials. In addition, it should be understood that the surfaces of certain liquid crystal layers, including the interface(s) of such layers with other material(s) or layers(s), may be imperfect, wherein said surfaces represent an interpenetrating, entangled or convoluted network with other material(s) or layer(s). Similarly, it should also be understood that liquid crystal layers may be uniform or discontinuous, such that the continuity of said liquid crystal layer along the length and width may be disturbed or otherwise interrupted by other layer(s) or material(s).

In one embodiment, the liquid crystal layer is a transparent layer. In another embodiment, the liquid crystal layer is a semi-transparent layer.

In some embodiments, the liquid crystal layer is a film of a thickness of from about 0.01 nanometer to about 10 centimeters. For example, in some embodiments, the liquid crystal layer is a film of a thickness of from about 0.1 nanometer to about 10 millimeters. In some embodiments, the liquid crystal layer is a film of a thickness of from about 0.1 nanometer to about 10 micrometers. In some embodiments, the liquid crystal layer is a film of a thickness of from about 0.1 nanometer to about 10 nanometers. In some embodiments, the liquid crystal layer is a film of a thickness of from about 0.1 nanometer to about 1 millimeter. In some embodiments, the liquid crystal layer is a film of a thickness of from about 1 nanometer to about 10 millimeter. In some embodiments, the liquid crystal layer is a film of a thickness of from about 1 nanometer to about 1 micrometer. In some embodiments, the liquid crystal layer is a film of a thickness of from about 5 nanometers to about 100 nanometers. In some embodiments, the liquid crystal layer is a film of a thickness of from about 10 nanometers to about 50 nanometers.

In various embodiments, the liquid crystal layer comprises a liquid crystal comprising cholesteryl oleyl carbonate or a derivative or a salt thereof, cholesteryl pelargonate or a derivative or a salt thereof, cholesteryl benzoate or a derivative or a salt thereof, or any combination thereof. For example, in some embodiments, the liquid crystal comprises about 450 mg cholesteryl oleyl carbonate or a derivative or a salt thereof, about 450 mg cholesteryl pelargonate or a derivative or a salt thereof, about 100 mg cholesteryl benzoate or a derivative or a salt thereof, or any combination thereof. In some embodiments, the liquid crystal comprises about 0.66 mmol cholesteryl oleyl carbonate or a derivative or a salt thereof, about 0.88 mmol cholesteryl pelargonate or a derivative or a salt thereof, about 0.20 mmol cholesteryl benzoate or a derivative or a salt thereof, or any combination thereof.

In one embodiment, the liquid crystal layer comprises a liquid crystal comprising cholesteryl ester liquid crystal. In another embodiment, the liquid crystal layer comprises a nonwoven cholesteryl ester liquid crystal scaffold. In another embodiment, the liquid crystal layer comprises an electrospun nonwoven cholesteryl ester liquid crystal scaffold. In other embodiments, the liquid crystal layer comprises synthetic polyurethane lacquer, natural lacquer derived from catechol molecules, urushiol mixtures, or any combination thereof.

In some embodiments, the liquid crystal layer has a mesophase between about 10° C. and about 60° C. In some embodiments, the liquid crystal layer forms striations at a temperature between about 17° C. and about 40° C. In some embodiments, the liquid crystal layer forms striations at a temperature between about 36° C. and about 40° C. In some embodiments, the liquid crystal layer forms striations at a temperature between about 26° C. and about 30° C.

In some embodiments, the device comprises a uniformly oriented liquid crystal.

In various embodiments, the liquid crystal layer comprises a mesogenic layer. In one embodiment, the liquid crystal layer comprises a mesogenic layer comprising cholesteryl oleyl carbonate or a derivative or a salt thereof, cholesteryl pelargonate or a derivative or a salt thereof, cholesteryl benzoate or a derivative or a salt thereof, or any combination thereof. In another embodiment, any compound or mixture of compounds that form a mesogenic layer can be used in conjunction with the present invention.

The mesogens can form thermotropic or lyotropic liquid crystals. The mesogenic layer can be either continuous or it can be patterned. Both the thermotropic and lyotropic liquid crystals can exist in a number of forms including nematic, chiral nematic, smectic, polar smectic, chiral smectic, frustrated phases and discotic phases.

The mesogenic layer can be a substantially pure compound, or it can contain other compounds that enhance or alter characteristics of the mesogen. Thus, in one embodiment, the mesogenic layer further comprises a second compound, for example an alkane, which expands the temperature range over which the nematic and isotropic phases exist.

In some embodiments, the mesogenic layer further comprises a dichroic dye or fluorescent compound. Examples of dichroic dyes and fluorescent compounds useful in the present invention include, but are not limited to, azobenzene, BTBP, polyazocompounds, anthraquinone, perylene dyes, and the like. In some embodiments, a dichroic dye of fluorescent compound is selected that complements the orientation dependence of the liquid crystal so that polarized light is not required for the device of the present invention to show different colors. In some embodiments, if the absorbance of the liquid crystal is in the visible range, then changes in orientation can be observed using ambient light without crossed polarizers. In other embodiments, the dichroic dye or fluorescent compound is used in combination with a fluorimeter and the changes in fluorescence are used to detect changes in orientation of the liquid crystal.

One approach to the patterning of the mesogenic layer on flat and curved surfaces is based on the use of patterned molecules, such as self-assembled monolayers (SAMs) of molecules to direct both the polar (away from the surface) and azimuthal (in the plane of the surface) orientations of the mesogenic layer. This method is simple and flexible, and any of the recently established procedures for patterning monolayers, such as SAMs, on surfaces (for example, microcontact printing or photo-patterning) (Talov et al., J. Am. Chem. Soc. 115: 5305 (1993); Kumar et al., Acc. Chem. Res. 28: 219 (1995), and references therein; Xia et al., J. Am. Chem. Soc. 117: 3274 (1995), and references therein can be used; Jackman et al., Science 269: 664 (1995)). Using any of these methods, SAMs, which pattern liquid crystals, can be easily extended to sizes ranging from hundreds of nanometers (Xia et al., J. Am. Chem. Soc. 117: 3274 (1995), Schwartz et al., J. Am. Chem. Soc. 138: 5957 (2016), and references therein) to millimeters and permit both planar (parallel to the surface) and homeotropic (perpendicular to the surface) orientation of mesogenic layers; methods based on the rubbing of polymer films mainly provide manipulation of the in-plane alignment of mesogenic layers and cannot homeotropically align mesogenic layers. One class of useful SAMs has surface energies (about 19 mJ/m$^2$) about half those of films of polyimides used for alignment of liquid crystals; low-energy surfaces are less prone to contamination by molecular adsorbates and dust particles than are high-energy ones. Because monolayers, such as SAMs, and other films can also be patterned on non-planar surfaces (Jackman et al., Science 269: 664 (1995)), patterned mesogenic structures formed with monolayers, such as SAMs, can be replicated on curved surfaces.

The capacity to pattern mesogenic layer orientations on nonplanar surfaces provides procedures for the fabrication of tunable hybrid diffractive-refractive devices. For example, devices based on combinations of diffractive and refractive optical processes permit aplanatic or chromatic correction in lenses, spectral dispersion, imaging from a single optical element, and other manipulations of light (Resler et al., Opt. Lett. 21, 689 (1996); S. M. Ebstein, ibid., p. 1454; M. B. Stem, Microelectron. Eng. 32, 369 (1996): Goto et al., Jpn. J. Appl. Phys. 31, 1586 (1992); Magiera et al., Soc. Photo-Opt. Instrum. Eng., 2774, 204 (1996)). The capability to pattern mesogenic layers on curved surfaces also provides routes for the fabrication of devices with wide viewing angles.

In one embodiment, the molecular monolayer film, such as SAM, is layered on a material suitable for use as an electrode. In one embodiment, the material is a metal film. In one embodiment, the metal film is a gold film. It is understood when the terms monolayer or SAM or monolayer film are used, multilayer films can also fulfill this role and are included here.

In various embodiments, the device is a tunable device. In some embodiments, the tunable device permits the manipulation of light. In one embodiment, the device is a refractive-diffractive device. In one embodiment, the device permits imaging from a single optical element. In one embodiment, the device permits aplanatic or chromatic correction in lenses. In one embodiment, the device allows for spectral dispersion. Thus, for example, in one embodiment, the tunable device changes color when exposed to a stimulus.

In various embodiments, the liquid crystal layer is a molecular switch. In one embodiment, the liquid crystal layer changes color when exposed to a stimulus.

The patterned mesogenic layers of the instant invention can be tuned by the use of at least one stimulus. In some embodiments, the stimulus comprises applying energy or a pH change to the device. Examples of such stimulus include, but are not limited to temperature, electric field (e.g., voltage), electromagnetic field, magnetic field, light, optical methods (e.g., ultraviolet (UV) irradiation, UV-vis-NIR irradiation, infrared (IR) irradiation, NIR irradiation), radiofrequencies, radiation, sound, hydration, pH, pressure, or any combination thereof.

In one embodiment, the stimulus is used to reversibly orient the mesogenic layer. In one embodiment, the stimulus is applied either perpendicular to, or in the plane of, the surface of the mesogenic layer. In one embodiment, the oriented mesogenic layer modulates the intensity of light diffracted from the layer.

For example, in one embodiment the patterned mesogenic layers of the instant invention can be tuned by the use of electric fields. In one embodiment, the electric field is used to reversibly orient the mesogenic layer. In one embodiment, the electric field is applied either perpendicular to, or in the plane of, the surface of the mesogenic layer. In one embodiment, the oriented mesogenic layer modulates the intensity of light diffracted from the layer.

In another embodiment, the patterned mesogenic layers of the instant invention can be tuned by the use of temperature (e.g., heat). In one embodiment, the temperature (e.g., heat) is used to reversibly orient the mesogenic layer. In one embodiment, the temperature (e.g., heat) is applied either perpendicular to, or in the plane of, the surface of the mesogenic layer. In one embodiment, the oriented mesogenic layer modulates the intensity of light diffracted from the layer.

In another embodiment, the mesogenic layer is subsequently cooled to form the liquid crystalline phase. The presence of the stimulus within regions of the mesogenic layer will disturb the equilibrium between the nematic and isotropic phases leading to different rates and magnitudes of nucleation at those sites. The differences between the nematic and isotropic regions are clearly detectable.

When the device is exposed to the stimulus, the orientation of the liquid crystal is disrupted. In some embodiments, the disruption of orientation can be detected by a variety of methods, including detecting a color change of the liquid crystal, viewing with crossed polarizers, measuring the threshold electrical field required to change the orientation of the liquid crystal, viewing in the presence of dichroic agents, or any combination thereof. The liquid crystals can be viewed using white light or using a specific wavelength or combination of wavelengths of light.

Although many changes in the mesogenic layer can be detected by visual observation under ambient light, any means for detecting the change in the mesogenic layer can be incorporated into, or used in conjunction with, the device. Thus, it is within the scope of the present invention to use lights, microscopes, spectrometry, electrical techniques and the like to aid in the detection of a change in the mesogenic layer.

In those embodiments utilizing light in the visible region of the spectrum, the light can be used to simply illuminate details of the mesogenic layer. Alternatively, the light can be passed through the mesogenic layer and the amount of light transmitted, absorbed or reflected can be measured. The device can utilize a backlighting device such as that described in U.S. Pat. No. 5,739,879, incorporated herein by reference. Light in the ultraviolet and infrared regions is also of use in the present invention.

The present invention also relates, in part, to the use of plate readers to detect changes in the orientation of mesogens. The plate readers may be used in conjunction with the LC assay devices described herein and also with the lyotropic LC assays described in U.S. Pat. No. 6,171,802, incorporated herein by reference. In particular, the present invention includes methods and processes for the quantification of light transmission through films of liquid crystals based on quantification of transmitted or reflected light.

The present invention is not limited to any particular mechanism of action. Indeed, an understanding of the mechanism of action is not required to practice the present invention. Nevertheless, in some embodiments, the ordered substrates impart order to thin films of liquid crystal placed onto their surface. These ordered films of liquid crystal preserve the plane of polarized light passed through them. If the liquid crystal possesses a well-defined distortion, such as a 90° twist distortion, then the liquid crystal changes the polarization of the transmitted light in a well-defined and predictable manner. In some embodiments, the ordered films of liquid crystal differentially absorb (relative to randomly ordered films of liquid crystal) specific wavelengths of light.

The device of the present invention can be of any configuration that allows for the contact of a mesogenic layer with the substrate. In various embodiments, the liquid crystal layer is placed on the substrate by electrospinning, spin coating, electrospraying, airbrushing, brushing, or any combination thereof of a liquid crystal on the substrate.

In various embodiments, the liquid crystal layer is placed on the substrate in a solvent-free matter. For example, in some embodiments, the liquid crystal layer is placed on the substrate by solvent-free electrospinning, solvent-free spin coating, solvent-free electrospraying, solvent-free airbrushing, solvent-free brushing, or any combination thereof of a liquid crystal on the substrate.

In one embodiment, the substrate is chemically inert towards the mesogenic layer. In another embodiment, the substrate is reactive or interactive towards the mesogenic layer.

In various embodiments, the substrate comprises an organic layer, inorganic layer (e.g., metal, metal salt or metal oxide), or an organic-inorganic layer. In some embodiments, the substrate comprises an inorganic crystal, inorganic glass, or any combination thereof. For example, in some embodiments, the substrate is a glass, polymer, graphene, graphene oxide, graphite, metal, composite, wood, paper, rubber, fabric, fibrous network, mineral, brass, stones, natural stones used in watch dial manufacturing, laipis azul, meteorite, crystal, mineral, artificial mineral (e.g., artificial sapphire), or any combination thereof. In addition, in some embodiments, the surface of the substrate is functionalized with a molecular layer, such as a SAM, or with a polymer layer or layers, or any combination thereof.

In some embodiments, the substrate can be made of practically any physicochemically stable material. In one embodiment, the substrate material is non-reactive towards the constituents of the mesogenic layer. In some embodiments, the substrate is rigid or flexible. In some embodiments, the substrate is optically transparent or optically opaque. In some embodiments, the substrate is an electrical insulator, conductor, semiconductor, or any combination thereof. In some embodiments, the substrate can be either permeable or impermeable to materials, such as liquids, solutions, vapors and gases. In some embodiments, the substrate is substantially impermeable to liquids, vapors and/or gases or, alternatively, the substrates can be permeable to one or more of these classes of materials. Exemplary substrate materials include, but are not limited to, inorganic crystals, inorganic glasses, inorganic oxides, metals, organic polymers and combinations thereof.

In one embodiment, the substrate is a single layer substrate. In one embodiment, the substrate is a multilayer substrate. In one embodiment, the substrate comprises a uniform layer. In one embodiment, the substrate comprises a sub-layer. In some embodiment, the substrate is a stacked or side-by-side (i.e., adjacent) arrangement of substrate sublayers. In one embodiment, the substrate includes substrate sublayers that are arranged in a horizontally adjacent pattern. Thus, it should be understood that the substrate is not necessarily limited to single layers or sheets of materials. In addition, it should be understood that the surfaces of certain substrates, including the interface(s) of such substrate layers with other material(s) or layers(s), may be imperfect, wherein said surfaces represent an interpenetrating, entangled or convoluted network with other material(s) or layer(s). Similarly, it should also be understood that substrates may be uniform or discontinuous, such that the continuity of substrate layers along the length, width, and/or perimeter may be disturbed or otherwise interrupted by other layer(s) or material(s).

In some embodiments, inorganic crystals and inorganic glasses are utilized as substrate materials (e.g., LiF, NaF, NaCl, KBr, KI, CaF$_2$, MgF$_2$, HgF$_2$, BN, AsS$_3$, ZnS, Si$_3$N$_4$, etc.). The crystals and glasses can be prepared by art standard techniques (e.g., Goodman, C. H. L., Crystal Growth Theory and Techniques, Plenum Press, New York 1974). Alternatively, the crystals can be purchased commercially (e.g., Fischer Scientific). The crystals can be the sole component of the substrate or they can be coated with one or more additional substrate components. Thus, it is within the scope of the present invention to utilize crystals coated with, for example one or more metal films or a metal film and an organic polymer. Additionally, a crystal can constitute a portion of a substrate which contacts another portion of the substrate made of a different material, or a different physical form (e.g., a glass) of the same material. Other useful substrate configurations utilizing inorganic crystals and/or glasses will be apparent to those of skill in the art.

In some embodiments, metals are utilized as substrates. In some embodiments, the metal can be used as a crystal, a sheet, or a powder. In some embodiments, the metal can be deposited onto a backing by any method known to those of skill in the art including, but not limited to, evaporative deposition, sputtering, electroless deposition, electrolytic deposition, and adsorption or deposition of preform particles of the metal including metallic nanoparticles.

Any metal that is chemically inert towards the mesogenic layer can be useful as a substrate in the present invention. Metals that are reactive or interactive towards the mesogenic layer can also be useful in the present invention. Examples of such metals include, but are not limited to, gold, silver, platinum, palladium, nickel, copper, rhodium, iridium, or any combination thereof. In one embodiment, more than one metal is used. The more than one metal can be present as an alloy or they can be formed into a layered "sandwich" structure, or they can be laterally adjacent to one another. For example, in one embodiment, the metal used for the substrate is gold. In another embodiment, the metal used is gold layered on titanium.

The metal layers can be either permeable or impermeable to materials, such as liquids, solutions, vapors, and gases.

In some embodiments, organic layers (e.g., polymers) are utilized as substrate materials. In some embodiments, the organic layer is fabricated via thermal evaporation, ink-jet, organic vapor phase deposition (OVPD), organic vapor jet printing (OVJP), or any combination thereof. Other suitable fabrication methods of organic layers include spin coating and other solution based processes. In some embodiments, the solution based processes are carried out in nitrogen or an inert atmosphere.

In some embodiments, polymers (e.g., plastic) are utilized as substrate materials. In some embodiments, the polymer has molecular weight of 5 kDa-3000 kDa. For example, in one embodiment, the polymer has a molecular weight of 5 kDa-2000 kDa, 5 kDa-1500 kDa, 5 kDa-1000 kDa, 5 kDa-800 kDa, 5 kDa-500 kDa, 5 kDa-300 kDa or 5 kDa-200 kDa or 800 kDa-3000 kDa.

In some embodiments, the polymer is a straight chain polymer (i.e., linear polymer) or a branched chain polymer (i.e., branched polymer), including hyperbranched polymers. In some embodiments, the polymer is cross-linked.

In some embodiments, the polymer is a neutral polymer, ionic polymer, anionic polymer, or cationic polymer.

In some embodiments, the polymer is a homopolymer, copolymer, or block copolymer. In some embodiments, the block copolymer is a triblock, tetrablock, pentablock, or at least six block copolymer.

In some embodiments, the polymer is polyester, polyolefin, poly(vinyl chloride), polystyrene, polycaprolactone, polyethylene, polycarbonate, polyalkyleneimine (e.g., polyethyleneimine), polyallylamine, polyamidoamine, poly (amino-co-ester), or any combination thereof.

Examples of such polymers include, but are not limited to poly(ethylene oxide) (PEO) block copolymer, poly(ethylethylene) (PEE), poly(butadiene) (PB or PBD), poly(styrene) (PS), poly(isoprene) (PI), polyethyleneimine (PEI), poly(lactide-co-glycolic acid) (PLGA), biodegradable PLGA, polyethylene glycol (PEG), poly(lactide-co-glycolic acid)-polyethylene glycol (PLGA-PEG), poly(lactide-co-glycolic acid)-block-polyethylene glycol (PLGA-b-PEG), biodegradable PLGA-PEG, biodegradable PLGA-b-PEG, polyanhydride, polyanhydride-block-PEG copolymers, zwitterionic poly(carbobetaine), zwitterionic poly(sulfobetaine)-containing, zwitterionic poly(carbobetaine) and zwitterionic poly(sulfobetaine)-containing copolymers, poly (acrylic acid-co-distearin acrylate), poly(trimethylene carbonate)-block-poly(L-gluatamic acid), poly(ethylene glycol-block-L-aspartic acid), poly(2-hydroxyethyl-co-octadecyl aspartamide), poly(ethylene glycol-co-trimethylene carbonate-co-caprolactone, polypropylene oxide block copolymers, polyethylene oxide-block-polypropylene oxide copolymers, poly(ε-caprolactone) (PCL) diblock co-polymer, poly(ethylene oxide)-block-poly(ε-caprolactone) (PEO-b-PCL) based diblock copolymers, poly (lactic acid), poly(glycolide), poly(lactic-coglycolic acid), poly(3-hydroxybutyrate), poly(lactide-co-glycolic acid)-polyethylene glycol (PLGA-PEG), poly(lactide-co-glycolic acid)-block-polyethylene glycol (PLGA-b-PEG), chitosan, poly(2-N,N-dimethylaminoethylmethacrylate), poly-L-lysine, or any combination thereof.

In one embodiment, the polymer is an organic polymer. Examples of such organic polymers include, but are not limited to, polyalkenes (e.g., polyethylene, polyisobutene, polybutadiene), polyacrylics (e.g., polyacrylate, polymethyl methacrylate, polycyanoacrylate), polyvinyls (e.g., polyvinyl alcohol, polyvinyl acetate, polyvinyl butyral, polyvinyl chloride), polystyrenes, polycarbonates, polyesters, polyurethanes, polyamides, polyimides, polysulfone, polysiloxanes, polyheterocycles, cellulose derivative (e.g., methyl cellulose, cellulose acetate, nitrocellulose), polysilanes, fluorinated polymers, epoxies, polyethers, phenolic resins (e.g., Cognard, J. Alignment of Nematic Liquid Crystals and Their Mixtures, in Mol. Cryst. Liq. Cryst. 1: 1-74 (1982)), polydimethylsiloxane, polyethylene, polyacrylonitrile, cellulosic materials, polycarbonates, polyvinyl pyridinium, or any combination thereof.

In one embodiment, the polymer is a biodegradable polymer.

In some embodiments, the polymer is permeable to gases, liquids, molecules in solution, or any combination thereof. In some embodiments, the polymer is impermeable to gases, liquids, molecules in solution, or any combination thereof.

In some embodiments, composites are utilized as substrate materials. In some embodiments, the composite is an organic-inorganic composite, nacre, glass composite, fiber composite, glass fiber composite, carbon composite, or any combination thereof.

In other embodiments, inorganic oxides are utilized as the substrate. Inorganic oxides of use in the present invention include, for example, $Cs_2O$, $Mg(OH)_2$, $TiO_2$, $ZrO_2$, $CeO_2$, $Y_2O_3$, $Cr_2O_3$, $Fe_2O_3$, NiO, ZnO, $Al_2O_3$, $SiO_2$ (glass), quartz, $In_2O_3$, $SnO_2$, $PbO_2$ and the like. The inorganic oxides can be utilized in a variety of physical forms such as composites, films, supported powders, glasses, crystals and the like. A substrate can consist of a single inorganic oxide or a composite of more than one inorganic oxide. For example, a composite of inorganic oxides can have a layered structure (i.e., a second oxide deposited on a first oxide) or two or more oxides can be arranged in a contiguous non-layered structure. In addition, one or more oxides can be admixed as particles of various sizes and deposited on a support, such as a glass or metal sheet. Further, a layer of one or more inorganic oxides can be intercalated between two other substrate layers (e.g., metal-oxide-metal, metal-oxide-crystal).

In one embodiment, the substrate is a rigid structure that is impermeable to liquids and gases. In this embodiment, the substrate consists of a glass plate onto which a metal, such as gold is layered by evaporative deposition. In one embodiment, the substrate is a glass plate ($SiO_2$) onto which a first metal layer, such as titanium, has been layered. A layer of a second metal, such as gold, can be then layered on top of the first metal layer.

In one embodiment, the substrate is permeable and it consists of a layer of gold, or gold over titanium, which is deposited on a polymeric membrane, or other material, that is permeable to liquids, vapors and/or gases. The liquids and gases can be pure compounds (e.g., chloroform, carbon monoxide) or they can be compounds that are dispersed in other molecules (e.g., aqueous protein solutions, herbicides in air, alcoholic solutions of small organic molecules). Useful permeable membranes include, but are not limited to, flexible cellulosic materials (e.g., regenerated cellulose dialysis membranes), rigid cellulosic materials (e.g., cellulose ester dialysis membranes), rigid polyvinylidene fluoride membranes, polydimethylsiloxane and track etched polycarbonate membranes.

In one embodiment, the layer of gold on the permeable membrane is itself permeable. In one embodiment, the permeable gold layer has a thickness of about 70 Angstroms or less.

In some embodiments, the substrate is a film of a thickness of from about 0.01 nanometer to about 10 centimeters. For example, in some embodiments, the substrate is a film of a thickness of from about 0.1 nanometer to about 10 millimeters. In some embodiments, the substrate is a film of a thickness of from about 0.1 nanometer to about 10 micrometers. In some embodiments, the substrate is a film of a thickness of from about 0.1 nanometer to about 10 nanometers. In some embodiments, the substrate is a film of a thickness of from about 0.1 nanometer to about 1 millimeter. In some embodiments, the substrate is a film of a thickness of from about 1 nanometer to about 10 millimeter. In some embodiments, the substrate is a film of a thickness of from about 1 nanometer to about 1 micrometer. In some embodiments, the substrate is a film of a thickness of from about 5 nanometers to about 100 nanometers. In some embodiments, the substrate is a film of a thickness of from about 10 nanometers to about 50 nanometers.

In some embodiments, the nature of the surface of the substrate has a profound effect on the anchoring of the mesogenic layer that is associated with the surface. The surface can be engineered by the use of mechanical and/or chemical techniques. The surface of each of the above enumerated substrates can be substantially smooth. Alternatively, the surface can be roughened or patterned by rubbing, etching, grooving, stretching, stressing, impacting, nano-blasting, oblique deposition, or other similar techniques known to those of skill in the art. Of particular relevance is the texture of the surface that is in contact with the meso-genic compounds.

In some embodiments, the substrate surface is prepared by rubbing, nanoblasting (i.e., abrasion of a surface with submicron particles to create roughness), or oblique deposition of a metal. In some embodiments, the substrate provides a uniform, homogenous surface, while in other embodiments, the surface is heterogenous. In some embodiments, the substrate is patterned.

In one embodiment, the substrate is glass or an organic polymer and the surface has been prepared by rubbing. Rubbing can be accomplished using virtually any material including tissues, paper, fabrics, brushes, polishing paste, etc. In one embodiment, the rubbing is accomplished by use of a diamond rubbing paste. In another embodiment, the face of the substrate that contacts the mesogenic compounds is a metal layer that has been obliquely deposited by evaporation.

In some embodiments, the substrate comprises an aniso-tropic surface prepared by nanoblasting a substrate with nanometer scale beads (e.g., about 1-200 nm, such as about 50-100 nm) at a defined angle of incidence (e.g., from about 5-85°, such as about 45°). The nanoblasted surface can be utilized as is or can be further modified, such as by obliquely depositing gold on the surface or by chemically functional-izing with a molecular layer so as to change its surface chemical and physical properties (Hohman J N et al., ACS Nano 2009, 3, 3, 527-536; Kim J et al., Nano Lett. 2014, 14, 5, 2946-2951; Schwartz J J et al., J. Am. Chem. Soc. 2016, 138, 18, 5957-5967).

In some embodiments, the substrate comprises an aniso-tropic surface prepared by stretching an appropriate sub-strate. For example, polymer substrates, such as polystyrene, can be stretched by heating to a temperature above the glass transition temperature of the substrate, applying a tensile force, and cooling to a temperature below the glass transition temperature before removing the force.

In some embodiments, the substrate comprises heterog-enous features for use in the various devices and methods. In some embodiments, the heterogenity is a uniform or non-uniform gradient in topography across the surface. For example, gold can be deposited onto a substrate at varying angles of incidence. Regions containing gold deposited at a near-normal angle of incidence will cause non-uniform anchoring of the liquid crystal, while areas in which the angle of incidence was greater than 10° will uniformly orient crystals. Alternatively, the heterogeneity may be the pres-ence of two or more distinct scales topography distributed uniformly across the substrate.

In some embodiments, the substrate is patterned. The substrate can be patterned using techniques such as photo-lithography (Kleinfield et al., J. Neurosci. 8:4098-120 (1998)), photoetching, chemical etching, microcontact print-ing (Kumar et al., Langmuir 10:1498-511 (1994)), and chemical spotting.

The size and complexity of the pattern on the substrate is limited only by the resolution of the technique utilized and the purpose for which the pattern is intended. For example, using microcontact printing, features as small as 200 nm have been layered onto a substrate (e.g., Xia, Y.; Whitesides, G., J. Am. Chem. Soc. 117:3274-75 (1995)). Similarly, using photolithography, patterns with smaller features have been produced (e.g., Hickman et al., J. Vac. Sci. Technol. 12:607-16 (1994); Smith R K et al., Progress in Surface Science, 2004, 75:1-68). Patterns which are useful in the present invention include those which comprise features such as wells, enclosures, partitions, recesses, inlets, outlets, channels, troughs, diffraction gratings, and the like.

In some embodiments, the patterning is used to produce a substrate having a plurality of adjacent wells, wherein each of the wells is isolated from the other wells by a raised wall or partition and the wells do not fluidically communicate. Thus, a liquid crystal, or other substance, placed in a particular well remains substantially confined to that well. In some embodiments, the patterning allows the creation of channels through the device whereby a stimulus can enter and/or exit the device.

The pattern can be printed directly onto the substrate or, alternatively, a "lift off" technique can be utilized. In the lift off technique, a patterned resist is laid onto the substrate, an organic layer is laid down in those areas not covered by the resist and the resist is subsequently removed. Resists appropriate for use with the substrates of the present invention are known to those of skill in the art (e.g., Kleinfield et al., J. Neurosci. 8:4098-120 (1998); Liao W S et al, 2012, Science, 337:1517-1521). Following removal of the photoresist, a second organic layer, having a structure different from the first organic layer, can be bonded to the substrate on those areas initially covered by the resist. Using this technique, substrates with patterns having regions of different chemical characteristics can be produced. Thus, for example, a pattern having an array of adjacent wells can be created by varying the hydrophobicity/hydrophilicity, charge and other chemical characteristics of the pattern constituents. In one embodiment, hydrophilic compounds can be confined to individual wells by patterning walls using hydrophobic materials. Similarly, positively or negatively charged compounds can be confined to wells having walls made of compounds with charges similar to those of the confined compounds. Similar substrate configurations are accessible through microprinting a layer with the desired characteristics directly onto the substrate (e.g., Mrkish, M.; Whitesides, G. M., Ann. Rev. Biophys. Biomol. Struct. 25:55-78 (1996); Liao W S et al, 2012, Science, 337:1517-1521).

In some embodiments, the patterned substrate controls the anchoring alignment of the liquid crystal. In one embodiment, the substrate is patterned with an organic compound (e.g., organic polymer) that forms a SAM. In one embodiment, the organic layer controls the azimuthal orientation and/or polar orientation of a supported mesogenic layer.

In addition to the ability of a substrate to anchor a mesogenic layer, an organic layer attached to the substrate is similarly able to provide such anchoring. A wide range of organic layers can be used in conjunction with the present invention. These include, but are not limited to, organic layers formed from organosulfur compounds (e.g., thiols and disulfides), organosilanes, amphiphilic molecules, cyclodextrins, polyols (e.g., poly(ethyleneglycol), poly(propylene glycol), fullerenes, and biomolecules.

An organic layer that is bound to, supported on or adsorbed onto, the surface of the substrate can anchor a mesogenic layer. As used herein, the term "anchoring" refers to the set of orientations adopted by the molecules in the mesogenic phase. The mesogenic layer will adopt particular orientations while minimizing the free energy of the interface between the organic layer and the mesogenic layer. The orientation of the mesogenic layer is referred to as an "anchoring direction." A number of anchoring directions are possible.

In some embodiments, the particular anchoring direction adopted will depend upon the nature of the mesogenic layer, the organic layer and the substrate. Anchoring directions of use in the present invention include, for example, conical anchoring, degenerate anchoring, homeotropic anchoring, multistable anchoring, planar anchoring and tilted anchoring. In some embodiments, the anchoring is a planar anchoring or homeotropic anchoring.

The anchoring of mesogenic compounds by surfaces has been extensively studied for a large number of systems (e.g., Jerome, Rep. Prog. Phys. 54:391-451 (1991)). The anchoring of a mesogenic substance by a surface is specified, in general, by the orientation of the director of the bulk phase of the mesogenic layer. The orientation of the director, relative to the surface, is described by a polar angle (measured from the normal of the surface) and an azimuthal angle (measured in the plane of the surface).

Control of the anchoring of mesogens has been largely based on the use of organic surfaces prepared by coating surface-active molecules or polymer films on inorganic (e.g., silicon oxide) substrates followed by surface treatments, such as rubbing. Other systems, which have been found useful, include surfaces prepared through the reactions of organosilanes with various substrates (e.g., Yang et al., In Microchemistry: Spectroscopy and Chemistry In Small Domains; Masuhara et al., Eds.; North-Holland, Amsterdam, 1994; p. 441).

Molecularly designed surfaces formed by organic layers on a substrate can be used to control both the azimuthal and polar orientations of a supported mesogenic layer. SAMs can be patterned on a surface. For example, patterned substrate or pattern organic layers made from $CH_3(CH_2)_{14}SH$ and $CH_3(CH_2)_{15}SH$ on obliquely deposited gold produce a supported mesogenic layer which is twisted 90°. Other anchoring modes are readily accessible by varying the chain length and the number of species of the organic layer constituents (e.g., Gupta and Abbott, Science 276:1533-1536 (1997)).

Transitions between anchoring modes have been obtained on a series of organic layers by varying the structure of the organic layer. The structural features which have been found to affect the anchoring of mesogenic compounds include, for example, the density of molecules within the organic layer, the size and shape of the molecules constituting the organic layer and the number of individual layers making up the bulk organic layer.

The density of the organic layer on the substrate has been shown to have an effect on the mode of mesogen anchoring. For example, transitions between homeotropic and degenerate anchorings have been obtained on surfactant monolayers by varying the density of the monolayers (e.g., Proust et al., Solid State Commun. 11: 1227-30 (1972)). Thus, it is within the scope of the present invention to tailor the anchoring mode of a mesogen by controlling the density of the organic layer on the substrate.

The molecular structure, size, and shape of the individual molecules making up the organic layer also affects the anchoring mode. For example, it has been demonstrated that varying the length of the aliphatic chains of surfactants on a substrate can also induce anchoring transitions; with long chains, a homeotropic anchoring is obtained while with short chains, a conical anchoring is obtained with the tilt angle $\theta$ increasing as the chain becomes shorter (e.g., Porte, J. Physique 37:1245-52 (1976)). Additionally, recent reports have demonstrated that the polar angle of the mesogenic phase can be controlled by the choice of the constituents of the organic layer (e.g., Gupta and Abbott, Langmuir 12:2587-2593 (1996)). The anchor can also include switchable elements, such as the photoswitchable chemical moiety azobenzene, so that the anchor can change between two or more states (e.g., Abendroth et al., ACS Nano 9:7746-7768 (2015)). The stimulation to induce switching could be light, electrochemical potential, electric field, pH, chemistry, and mechanical motion, among others. Thus, it is within the scope of the present invention to engineer the magnitude of the anchoring shift as well as the type of shift by the judicious choice of organic layer constituents.

A wide variety of organic layers are useful in practicing the present invention. These organic layers can comprise monolayers, bilayers, and multilayers. Furthermore, the organic layers can be attached by covalent bonds, ionic bonds, physisorption, chemisorption, and the like, including, but not limited to, hydrophobic interactions, hydrophilic interactions, van der Waals interactions, and the like.

In some embodiments, the organic layers form SAMs. The use of SAMs formed from alkanethiols on thin, semi-transparent films of gold in studies on the anchoring of liquid crystals on surfaces has been reported (e.g., Drawhorn and Abbott, J. Phys. Chem. 45:16511 (1995)). The principal result of that work was the demonstration that SAMs formed from n-alkanethiols with long $(CH_3(CH_2)_{15}SH)$ and short $(CH_3(CH_2)_4SH$ or $CH_3(CH_2)_9SH)$ aliphatic chains can homeotropically anchor mesogens. In contrast, single-component SAMs caused non-uniform, planar, or tilted anchoring at room temperature.

In some embodiments, SAMs are utilized as an exemplary organic layer. This use is not intended to be limiting. It will be understood that the various configurations of the self-assembled monolayers and their methods of synthesis, binding properties, and other characteristics are equally applicable to each of the organic layers of use in the present invention.

SAMs are generally depicted as an assembly of organized, closely packed linear molecules, but can also have other backbones, such as rigid cages (e.g., Hohman et al., Materials Science and Engineering: R: Reports 70 188-208 (2010)). There are two widely-used methods to deposit molecular monolayers on solid substrates: Langmuir-Blodgett transfer and self-assembly. Additional methods include techniques, such as depositing a vapor of the monolayer precursor onto a substrate surface and the layer-by-layer deposition of polymers and polyelectrolytes from solution (e.g., Guy Ladam, Pierre Schaaf, Frederic J. G. Cuisinier, Gero Decher, and Jean-Claude Voegel; Protein Adsorption onto Auto-Assembled Polyelectrolyte Films, Langmuir; 2001; 17(3); 878-882).

The composition of a layer of a SAM useful in the present invention can be varied over a wide range of compound structures and molar ratios. In one embodiment, the SAM is formed from only one compound. In another embodiment, the SAM is formed from two or more components. In one embodiment, when two or more components are used, one component is a long-chain hydrocarbon having a chain length of between 10 and 25 carbons and a second component is a short-chain hydrocarbon having a chain length of between 1 and 9 carbon atoms. In some embodiments, the SAM is formed from $CH_3(CH_2)_{15}SH$ and $CH_3(CH_2)_4SH$ or $CH_3(CH_2)_{15}SH$ and $CH_3(CH_2)_9SH$. In any of the above-described embodiments, the carbon chains can be functionalized at the co-terminus (e.g., $NH_2$, COOH, OH, CN), at internal positions of the chain (e.g., aza, oxa, thia) or at both the terminus and internal positions of the chain. In any of the above-described embodiments, switchable elements, such as azobenzene, can be included. In other embodiments, cage moieties, such as adamantanes, carboranes, fullerenes, or others, can comprise or can be included in the backbone.

In some embodiments, the mesogenic layer can be layered on top of one SAM layer or it can be sandwiched between two SAM layers. In some embodiments, the mesogenic layer is sandwiched between two SAMs and a second substrate is optionally substantially identical in composition to that bearing the SAM can be layered on top of the mesogenic layer. Alternatively, a compositionally different substrate can be layered on top of the mesogenic layer. In one embodiment, the second substrate is permeable. In some embodiments, two substrates are used, but only one of the substrates has an attached organic layer.

When the mesogenic layer is sandwiched between two layers of SAMs several compositional permutations of the layers of SAMs are available. For example, in one embodiment, the first organic layer and the second organic layer have substantially identical compositions and both of the organic layers bear an attached recognition moiety. A variation on this embodiment utilizes first and second organic layers with substantially similar compositions, wherein only one of the layers bears a recognition moiety.

In one embodiment, the first and second organic layers have substantially different compositions and only one of the organic layers has an attached recognition moiety. In another embodiment, the first organic layer and said second organic layer have substantially different compositions and both of the organic layers have an attached recognition moiety.

In one embodiment, the organic layers have substantially identical compositions and one or both of the organic layers have attached thereto a recognition moiety.

In some embodiments, the SAM is a reactive SAM component of the substrate surface. As used herein, "reactive SAM components" refers to components which have a functional group available for reaction with a recognition moiety or other species following the attachment of the component to the substrate.

In some embodiments, the reactive SAM components are processed under relatively mild conditions. These include, but are not limited to nucleophilic substitutions (e.g., reactions of amines and alcohols with acyl halides), electrophilic substitutions (e.g., enamine reactions) and additions to carbon-carbon and carbon-heteroatom multiple bonds (e.g., Michael reaction, Diels-Alder addition). These and other useful reactions are discussed in March, Advanced Organic Chemistry, Third Ed., John Wiley & Sons, New York, 1985.

According to the present invention, a substrate's surface is functionalized with SAM, components and other species by covalently binding a reactive SAM component to the substrate surface in such a way as to derivatize the substrate surface with a plurality of available reactive functional groups. Reactive groups, which can be used in practicing the present invention include, for example, amines, hydroxyl groups, carboxylic acids, carboxylic acid derivatives, alkenes, sulfhydryls, siloxanes, etc.

A wide variety of reaction types are available for the functionalization of a substrate surface. For example, substrates constructed of a polymer, such as polypropylene, can be surface derivatized by chromic acid oxidation, and subsequently converted to hydroxylated or aminomethylated surfaces. Substrates made from highly crosslinked divinyl-benzene can be surface derivatized by chloromethylation and subsequent functional group manipulation. Additionally, functionalized substrates can be made from etched, reduced polytetrafluoroethylene.

When the substrates are constructed of a siliceous material, such as glass, the surface can be derivatized by reacting the surface Si—OH, SiO—H, and/or Si—Si groups with a functionalizing reagent. When the substrate is made of a metal film, the surface can be derivatized with a material displaying avidity for that metal.

Substrates can be made reactive by plasma oxidation or by other means of chemical oxidation.

The hydrophilicity of the substrate surface can be enhanced by reaction with polar molecules such as amine-, hydroxyl-, and polyhydroxyl containing molecules. Representative examples include, but are not limited to, polylysine, polyethyleneimine, poly(ethyleneglycol), and poly (propyleneglycol). Suitable functionalization chemistries and strategies for these compounds are known in the art (e.g., Dunn, R. L., et al., Eds. Polymeric Drugs and Drug Delivery Systems, ACS Symposium Series Vol. 469, American Chemical Society, Washington, D.C. 1991).

The hydrophobicity of the substrate surface can be modulated by using a hydrophobic spacer arm, such as, for example, long chain diamines, longchain thiols, amino acids, etc. Representative hydrophobic spacers include, but are not limited to, 1,6-hexanediamine, 1,8-octanediamine, 6-aminohexanoic acid, and 8-aminooctanoic acid.

The substrate surface can also be made surface-active by attaching to the substrate surface a spacer that has surfactant properties. Compounds useful for this purpose include, for example, aminated or hydroxylated detergent molecules, such as, for example, 1-aminododecanoic acid.

In one embodiment, the spacer serves to distance the liquid crystal layer from the substrate or SAM.

In some embodiments, the physicochemical characteristics (e.g., hydrophobicity, hydrophilicity, surface activity, conformation) of the substrate surface and/or SAM are altered by attaching a monovalent moiety, which is different in composition than the constituents of the bulk SAM and which does not bear a recognition moiety. As used herein, "monovalent moiety" refers to organic molecules with only one reactive functional group. This functional group attaches the molecule to the substrate. "Monovalent moieties" are to be contrasted with the bifunctional "spacer" groups described above. Such monovalent groups are used to modify the hydrophilicity, hydrophobicity, binding characteristics, etc. of the substrate surface. Examples of groups useful for this purpose include, but are not limited to, long chain alcohols, amines, fatty acids, fatty acid derivatives, poly(ethylene glycol) monomethyl ethers, etc.

When two or more structurally distinct moieties are used as components of the SAMs, the components can be contacted with the substrate as a mixture of SAM components or, alternatively, the components can be added individually. In those embodiments, in which the SAM components are added as a mixture, the mole ratio of a mixture of the components in solution results in the same ratio in the mixed SAM. Depending on the manner in which the SAM is assembled, the two components do not phase segregate into islands (e.g., Bain and Whitesides, J. Am. Chem. Soc. 111:7164 (1989)).

The individual components of the SAMs can also be bound to the substrate in a sequential manner. Thus, in one embodiment, a first SAM component is attached to the substrate's surface by "underlabeling" the surface functional groups with less than a stoichiometric equivalent of the first component. The first component can be a SAM component liked to a terminal reactive group or recognition group, a spacer arm, or a monovalent moiety. Subsequently, the second component is contacted with the substrate. This second component can either be added in stoichiometric equivalence, stoichiometric excess or can again be used to underlabel to leave sites open for a third component. The functionalization of the substrate can be patterned using a number of techniques, such as rubber stamping (microcontact printing and its variants) with the molecules serving as the ink (e.g., Saavedra et al., Reports on Progress in Physics 73:036501 (2010)).

The only limitations on size and shape are those that arise from the situation in which the device is used or the purpose for which it is intended. The device can be planar or non-planar. Thus, it is within the scope of the present invention to use any number of polarizers, lenses, filters lights, and the like to practice the present invention.

In various embodiments, the device comprises a "spacer". In some embodiments, the "spacer" is a graphene, graphite, graphene oxide, or any combination thereof. In some embodiments, the device comprises a "spacer" between the liquid crystal layer and at least a portion of the surface of the substrate. In some embodiments, the "spacer" acts as a glue to hold the liquid crystal layer and at least a portion of the surface of the substrate. For example, in some embodiments, the device comprises graphene, graphite, graphene oxide, or any combination thereof that acts as a glue to hold the liquid crystal layer and at least a portion of the surface of the substrate.

In various embodiments, the device comprises a watch face. In one embodiment, the substrate of the device is a watch face.

In various embodiments, the device is a part of a watch face. In other embodiments, the device is a watch face.

Methods of Use

In one aspect, the present invention provides, in part, a method for varying the optical texture of the device of the present invention. In some embodiments, the method comprises varying the optical texture of the liquid crystal layer. In some embodiments, the method comprises varying the optical texture of the liquid crystal mesogen.

In various aspects, the present invention provides, in part, a method of using the device of the present invention in a wearable device (e.g., watch). For example, in one embodiment, the method comprises using the device of the present invention in a watch face.

In some aspects, the present invention provides, in part, a method of using the device of the present invention in medical applications.

Method of Preparation

The present invention also relates, in part, to methods, techniques, and strategies for fabricating and characterizing the devices described herein. In one aspect, the present invention relates, in part, to methods of generating the device described herein. In one embodiment, the present invention relates, in part, to methods generating a watch face.

In one aspect, the present invention relates, in part, to methods of fabricating a device, comprising the steps of: generating a liquid crystal mesogen comprising cholesteryl oleyl carbonate or a derivative or a salt thereof, cholesteryl pelargonate or a derivative or a salt thereof, cholesteryl benzoate or a derivative or a salt thereof, or any combination thereof; melting the liquid crystal mesogen; cooling the liquid crystal mesogen to generate a viscous liquid; and placing the viscous liquid on at least a portion of a surface of a first substrate to generate the liquid crystal layer on the substrate. In various aspects, the method further comprises placing a second substrate over the liquid crystal layer, such that the liquid crystal layer is between the first and second substrates.

In some embodiments, the method is a solvent-free method.

In other embodiments, the method comprises a solvent. In some embodiments, the solvent serves as a medium for a reaction that generates a liquid crystal mesogen comprising cholesteryl oleyl carbonate or a derivative or a salt thereof, cholesteryl pelargonate or a derivative or a salt thereof, cholesteryl benzoate or a derivative or a salt thereof, or any combination thereof. In some embodiments, the solvent serves as a medium for a medium for the distribution of components of different phases or extraction of components into said solvent. For example, in one embodiment, the solvent serves as a medium for a medium for the distribution of the viscous liquid crystals liquid while placing the viscous liquid on at least a portion of a surface of a first substrate to generate the liquid crystal layer on the substrate. In some embodiments, the solvent is a liquid in which the raw materials or the reaction mixture are dispersed, suspended, or at least partially solvated. Examples of solvents include, but are not limited to, alcohols, benzenes, toluenes, chloroforms, and cyclohexanes.

In some embodiments, the method of generating a device, comprising a substrate, having an external surface and an opposite internal surface, and a liquid crystal layer placed on at least a portion of the internal surface of the substrate, comprises: generating a liquid crystal mesogen comprising cholesteryl oleyl carbonate or a derivative or a salt thereof, cholesteryl pelargonate or a derivative or a salt thereof, cholesteryl benzoate or a derivative or a salt thereof, or any combination thereof; melting the liquid crystal mesogen; cooling the liquid crystal mesogen to generate a viscous liquid; and placing the viscous liquid on at least a portion of the internal surface of the substrate to generate the liquid crystal layer.

For example, in one embodiment, the method is a solvent-free method of fabricating a device, comprising the steps of: generating a liquid crystal mesogen comprising cholesteryl oleyl carbonate or a derivative or a salt thereof, cholesteryl pelargonate or a derivative or a salt thereof, cholesteryl benzoate or a derivative or a salt thereof, or any combination thereof; melting the liquid crystal mesogen; cooling the liquid crystal mesogen to generate a viscous liquid; obtaining a substrate having an external surface and an opposite internal surface, wherein the substrate is a planar or curved substrate; and placing the viscous liquid on at least a portion of the internal surface of the substrate to generate the liquid crystal layer.

In some embodiments, the method of generating a device, comprising a first substrate having an external surface and an opposite internal surface, a second substrate having an external surface and an opposite internal surface, and a liquid crystal layer placed between at least a portion of the internal surface of the first substrate and at least a portion of the internal surface of the second substrate, comprises: generating a liquid crystal mesogen comprising cholesteryl oleyl carbonate or a derivative or a salt thereof, cholesteryl pelargonate or a derivative or a salt thereof, cholesteryl benzoate or a derivative or a salt thereof, or any combination thereof; melting the liquid crystal mesogen; cooling the liquid crystal mesogen to generate a viscous liquid; placing the viscous liquid on at least a portion of the internal surface of the first substrate to generate the liquid crystal layer; and placing at least a portion of the internal surface of the second substrate on the liquid crystal layer.

For example, in one embodiment, the method is a solvent-free method of fabricating a device, comprising the steps of: generating a liquid crystal mesogen comprising cholesteryl oleyl carbonate or a derivative or a salt thereof, cholesteryl pelargonate or a derivative or a salt thereof, cholesteryl benzoate or a derivative or a salt thereof, or any combination thereof; melting the liquid crystal mesogen; cooling the liquid crystal mesogen to generate a viscous liquid; obtaining a first substrate having an external surface and an opposite internal surface and a second substrate having an external surface and an opposite internal surface; wherein the first substrate and second substrate are planar or curved substrates; and placing the viscous liquid on at least a portion of the internal surface of the first substrate to generate the liquid crystal layer; and placing at least a portion of the internal surface of the second substrate on the liquid crystal layer to place the liquid crystal layer between at least a portion of the internal surface of the first substrate and at least a portion of the internal surface of the second substrate.

In various embodiments, the liquid crystal mesogen can be generated using any method described herein.

In some embodiments, the liquid crystal layer can be generated using any method described herein. For example, in some embodiments, the liquid crystal layer can be generated by melting the liquid crystal mesogen at about 60° C.; cooling the liquid crystal mesogen to generate a viscous liquid; and placing the viscous liquid on at least a portion of the internal surface of the substrate.

In some embodiments, the viscous liquid can be placed on at least a portion of the internal surface of the substrate using any method described herein. For example, in one embodiment, the viscous liquid can be placed on at least a portion of the internal surface of the substrate using solvent-free electrospinning, solvent-free spin coating, solvent-free electrospraying, solvent-free airbrushing, solvent-free brushing, or any combination thereof.

In various embodiments, the substrate can be prepared using any method described herein. For example, in some embodiments, the substrate surface is prepared by rubbing, nanoblasting (i.e., abrasion of a surface with submicron particles to create roughness), or oblique deposition of a metal. In some embodiments, the substrate provides a uniform, homogenous surface, while in other embodiments, the surface is heterogenous. In some embodiments, the substrate is patterned.

It will be understood by those of skill in the art that numerous and various modifications can be made without departing from the spirit of the present disclosure. Therefore, it should be clearly understood that the forms disclosed herein are illustrative only and are not intended to limit the scope of the present disclosure.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Example 1: Irridescent Dial Coatings for Horological Timepieces

Figure 2:
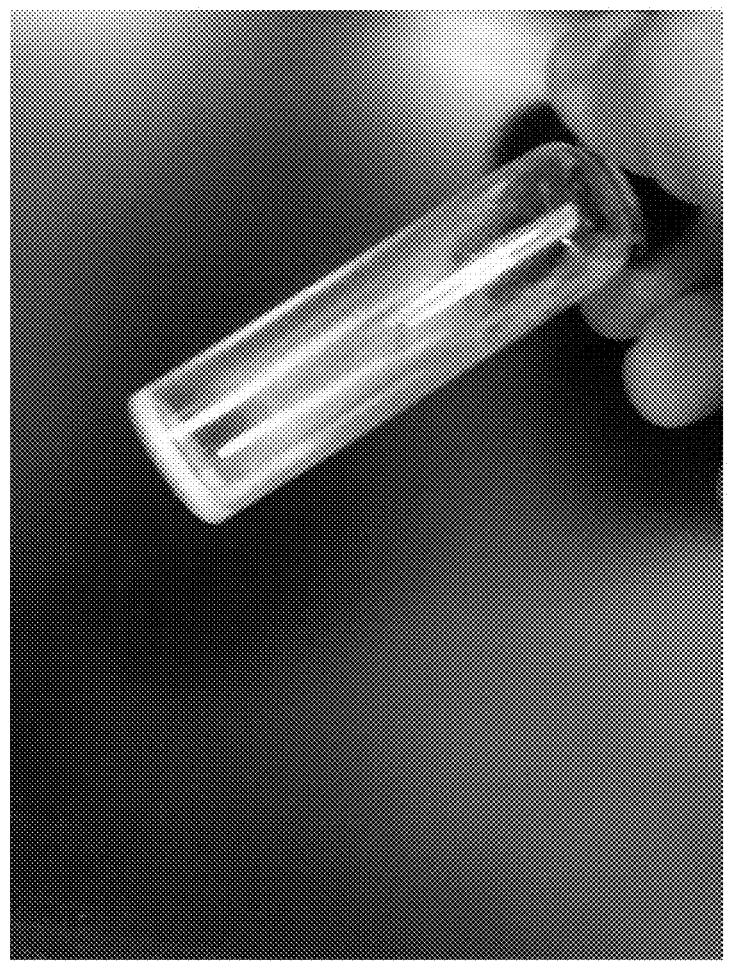
FIG. 2 depicts a representative melted liquid crystal in a vial.
Figure 3:
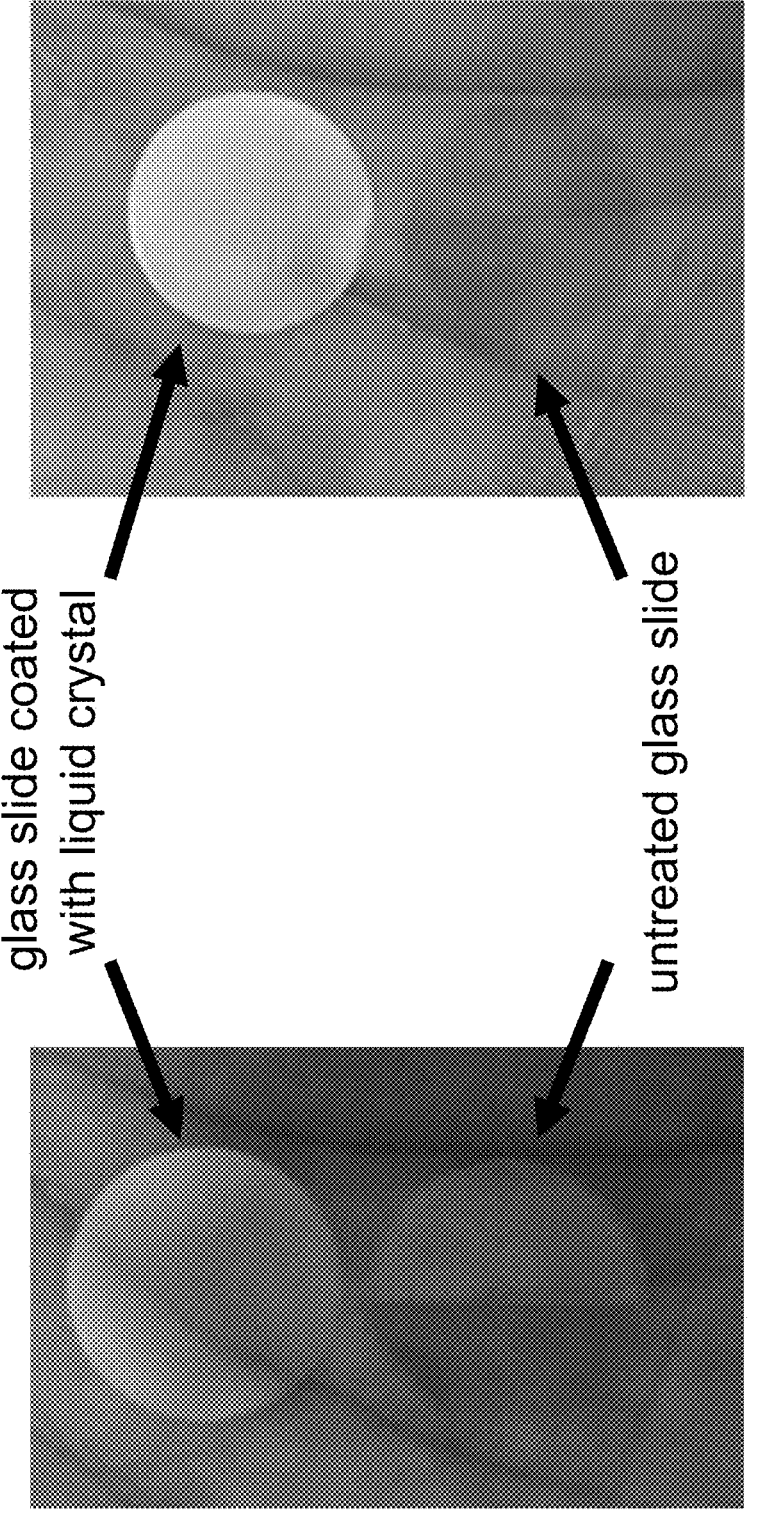
FIG. 3 depicts a representative liquid crystal coated glass slide vs untreated glass slide.
Figure 4:
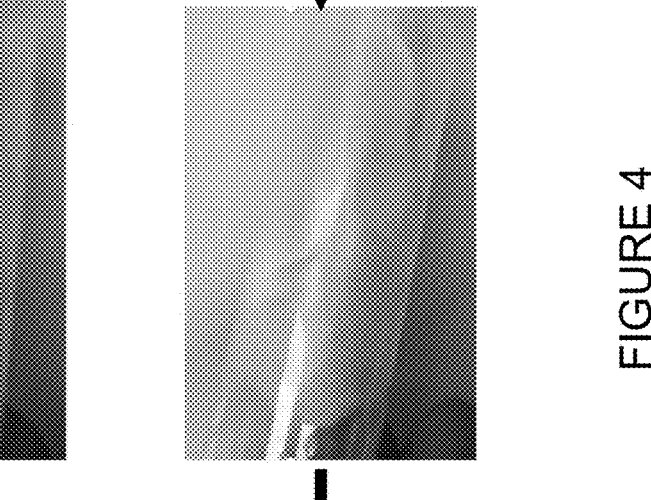
FIG. 4 depicts a representative color changing behavior of the liquid crystals when presented at different angles.
Figure 4:
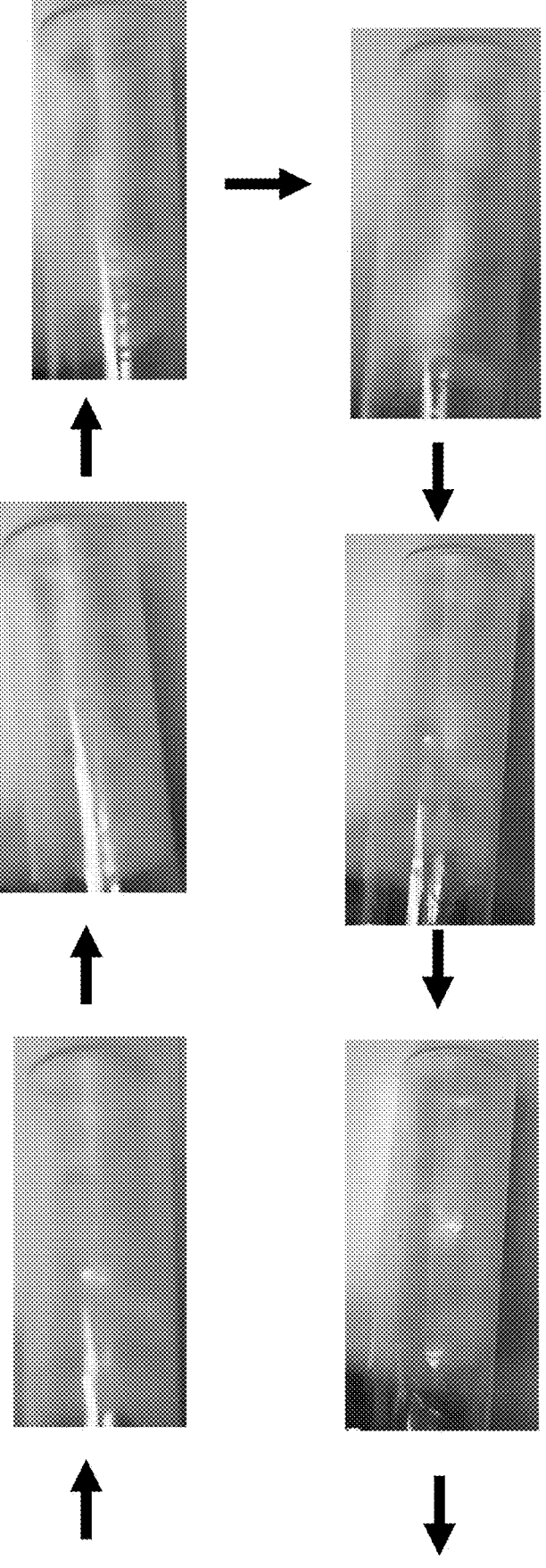
Figure 4:
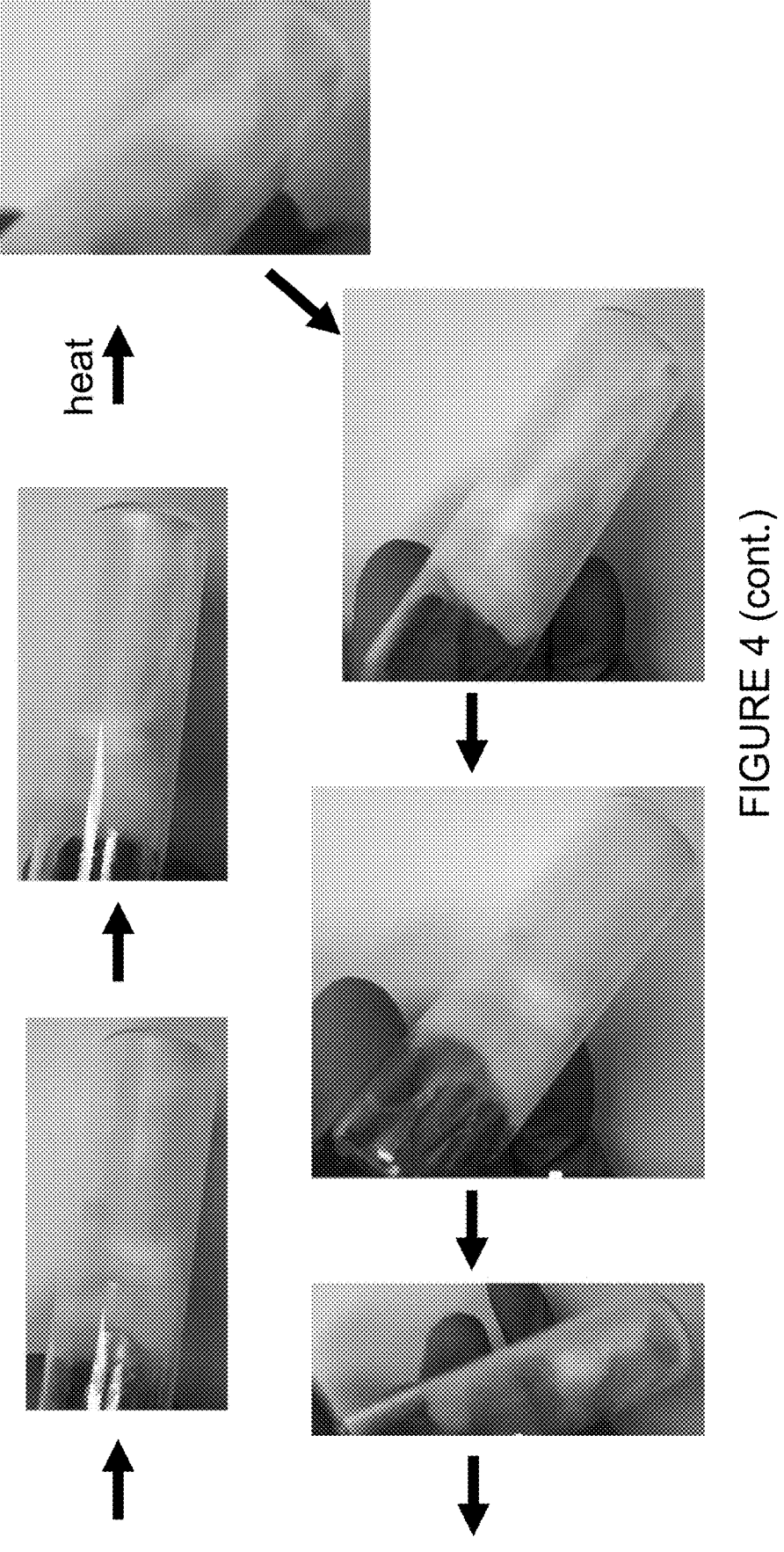
Figure 4:
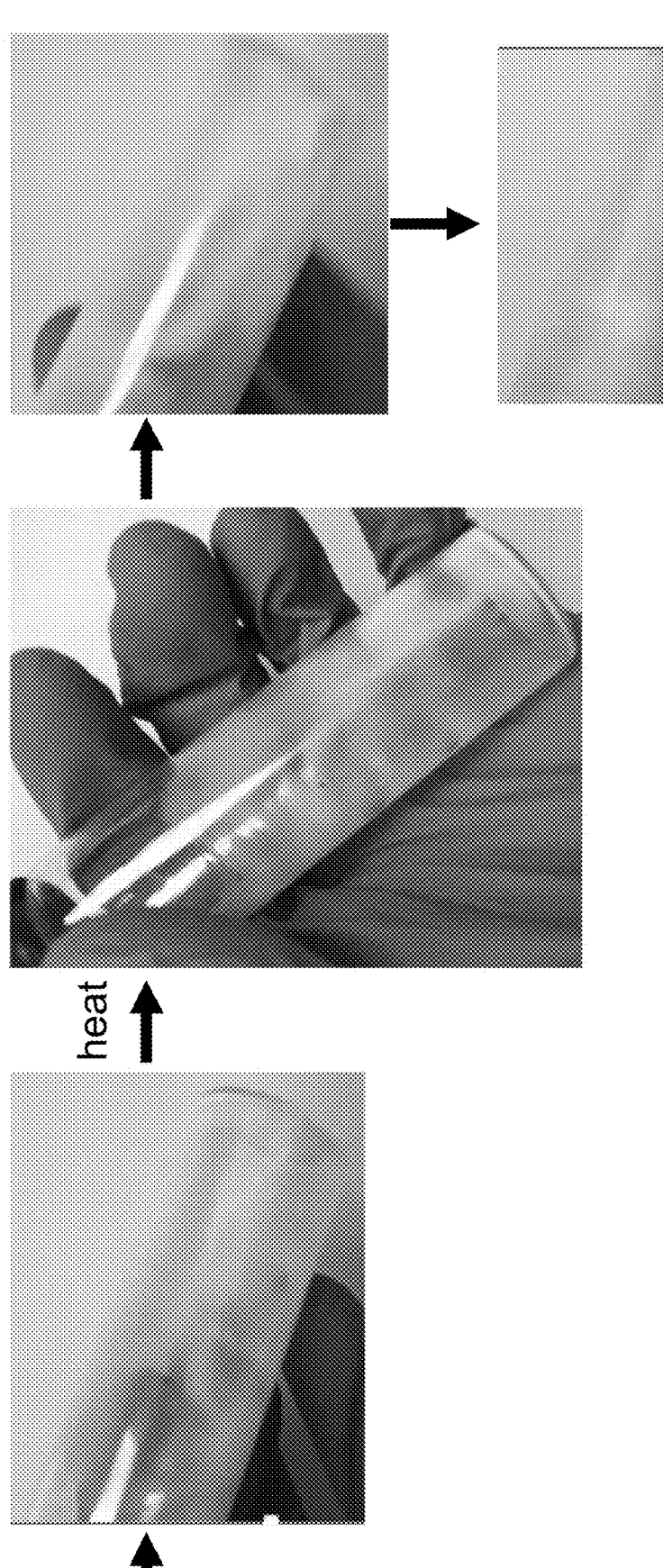
Figure 5:
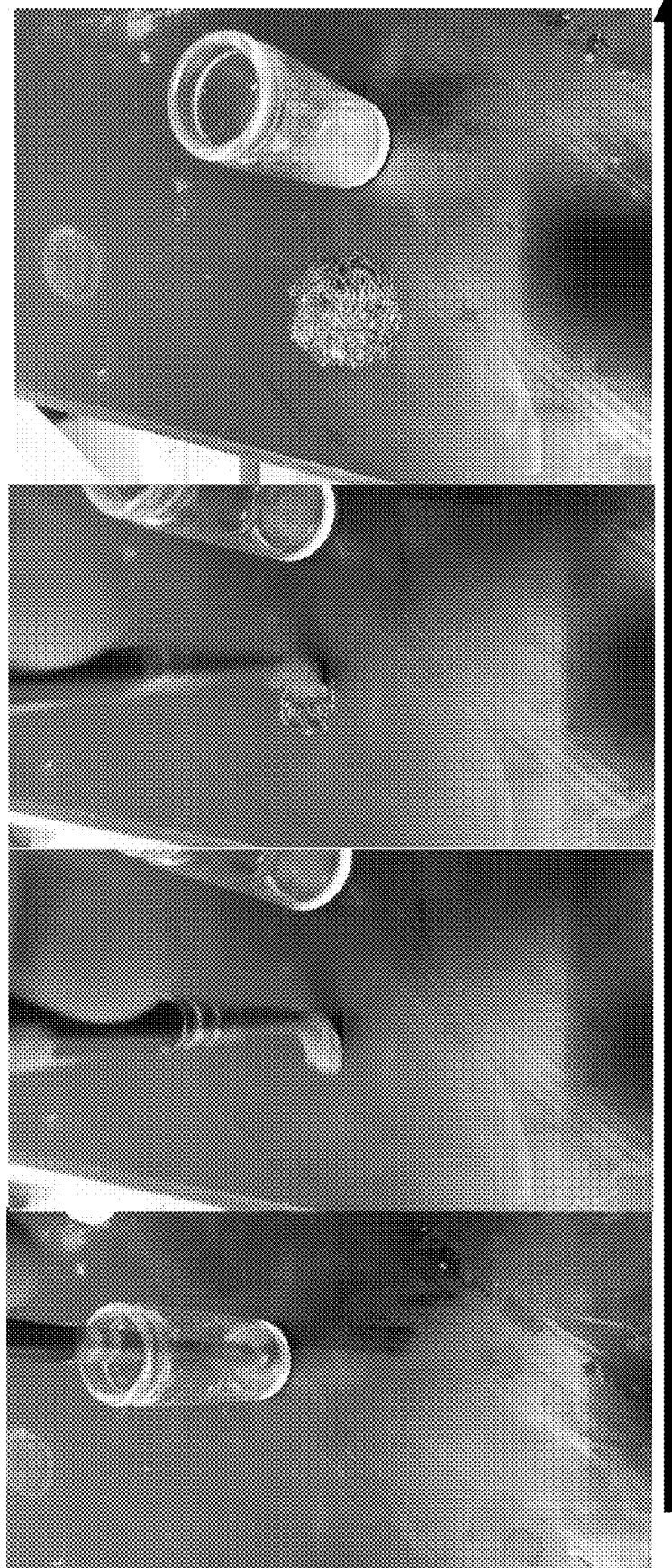
FIG. 5 depicts a representative application of the iridescent liquid on to the surface of the watch dial via brushing.

The present study discloses the development of a mass manufacturing method for depositing liquid crystal mesogens on the surface of a watch dial to generate iridescent surfaces. The materials were composed of cholesteryl oleyl carbonate, cholesteryl pelargonate, and cholesteryl benzoate (e.g., 70 mg cholesteryl oleyl carbonate, 10 mg cholesteryl pelargonate, and 20 mg cholesteryl benzoate as shown in FIG. 1 or 450 mg cholesteryl oleyl carbonate (0.66 mmol), 450 mg cholesteryl pelargonate (0.88 mmol), 100 mg cholesteryl benzoate (0.20 mmol)), melted at 60° C. (FIG. 2), and then cooled into a viscous iridescent liquid. Alternatively, increasing the molar concentration of cholesteryl oleyl carbonate caused helix assembly to occur at lower temperature, due to packing irregularities caused by the double bond of the mesogen. The iridescent liquid was then applied to the surface of the watch dial via various methods, such as spin coating, electrospraying, airbrushing, and brushing (FIG. 3 through FIG. 5). This specific composition lacked any polymer, such as polycaprolactone (PCL) polymer, as well as any solvents that are historically necessary for electrospinning methods relating to LCs. Furthermore, varying the specific composition between the three mesogens provided a 3-4° C. degree in helix (striations) assembly.

Figure 6:
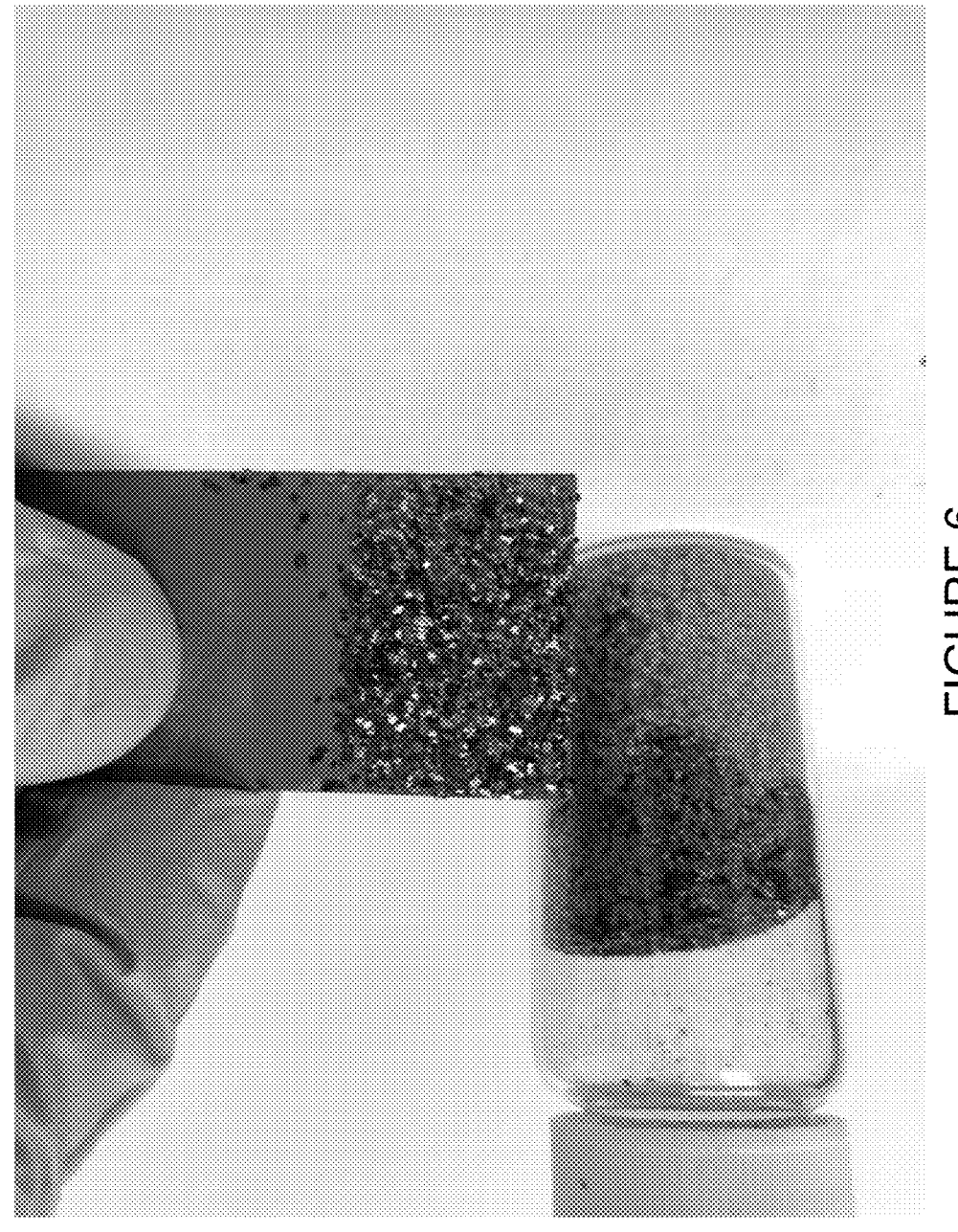
FIG. 6 depicts a representative flakes of graphite.

Additional studies assemble flakes of graphite (FIG. 6) in a nacre fashion and the liquid crystal acts as glue that holds the flakes that are later sintered together in oxygen free environment. This generates a reflective surface of carbon. Other studies assemble flakes of graphite (FIG. 6) in a nacre fashion and the liquid crystal acts as glue that holds the flakes without the sintering step in oxygen free environment. This generates a reflective surface of carbon.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. A solvent-free method of fabricating a device, wherein the method comprises the steps of:
   (a) generating a liquid crystal mesogen comprising cholesteryl oleyl carbonate or a derivative or a salt thereof, cholesteryl pelargonate or a derivative or a salt thereof, cholesteryl benzoate or a derivative or a salt thereof, or any combination thereof;
   (b) melting the liquid crystal mesogen;

(c) cooling the liquid crystal mesogen to generate a viscous liquid; and
   (d) placing the viscous liquid on at least a portion of a surface of a first substrate to generate the liquid crystal layer on the substrate.

2. The method of claim 1, further comprising placing a second substrate over the liquid crystal layer, such that the liquid crystal layer is between the first and second substrates.

3. The method of claim 2, wherein the first and second substrates protect the liquid crystal layer from exposure to at least one selected from the group consisting of gas, vapor, moisture, pressure, temperature, and any combination thereof.

4. The method of claim 1, wherein the substrate is selected from the group consisting of a transparent substrate, semi-transparent substrate, and opaque substrate.

5. The method of claim 1, wherein the substrate comprises at least one selected from the group consisting of glass, polymer, graphene, graphene oxide, graphite, metal, composite, wood, paper, rubber, fabric, fibrous network, mineral, and any combination thereof.

6. The method of claim 5, wherein the polymer is selected from the group consisting of polyester, polyolefin, polyvinyl chloride, polystyrene, polycaprolactone, polyethylene, polycarbonate, and any combination thereof.

7. The method of claim 5, wherein the composite is selected from the group consisting of an organic-inorganic composite, nacre, glass composite, fiber composite, glass fiber composite, carbon composite, and any combination thereof.

8. The method of claim 1, wherein the liquid crystal mesogen is melted at about 60° C.

9. The method of claim 1, wherein the liquid crystal mesogen comprises cholesteryl ester liquid crystal mesogen.

10. The method of claim 1, wherein the viscous liquid is placed on at least a portion of the surface of the first substrate by solvent-free electrospinning, solvent-free spin coating, solvent-free electrospraying, solvent-free airbrushing, solvent-free brushing, or any combination thereof.

11. The method of claim 1, wherein the liquid crystal layer comprises an electrospun nonwoven cholesteryl ester liquid crystal scaffold.

12. The method of claim 1, wherein the liquid crystal layer has a mesophase between about 10° C. and about 60° C.

13. The method of claim 1, wherein the liquid crystal layer forms striations at a temperature between about 36° C. and about 40° C.

14. The method of claim 1, wherein the device is a tunable device.

15. The method of claim 14, wherein the tunable device changes color when exposed to a stimulus.

16. The method of claim 15, wherein the stimulus comprises a change in at least one selected from the group consisting of temperature, voltage, light, radiation, sound, hydration, pH, pressure, and any combination thereof.

17. The method of claim 14, wherein the liquid crystal layer is a molecular switch, wherein the liquid crystal layer changes color when exposed to a stimulus.

* * * * *